US012637598B2

(12) United States Patent
Garnier et al.

(10) Patent No.: US 12,637,598 B2
(45) Date of Patent: May 26, 2026

(54) HEAT-CROSSLINKABLE ADHESIVE COMPOSITION FORMING A HEAT-STABLE ADHESIVE SEAL

(71) Applicant: BOSTIK SA, Colombes (FR)

(72) Inventors: Claire Garnier, Venette (FR); Darius Deak, Wauwatosa, WI (US)

(73) Assignee: BOSTIK SA, Colombes (FR)

( * ) Notice: Subject to any disclaimer, the term of this patent is extended or adjusted under 35 U.S.C. 154(b) by 717 days.

(21) Appl. No.: 18/067,105

(22) Filed: Dec. 16, 2022

(65) Prior Publication Data

US 2023/0193098 A1 Jun. 22, 2023

(30) Foreign Application Priority Data

Dec. 20, 2021 (FR) .................................. FR2114001

(51) Int. Cl.

| | |
|---|---|
| ***C09J 183/06*** | (2006.01) |
| ***C08G 18/48*** | (2006.01) |
| ***C08G 18/77*** | (2006.01) |
| ***C08G 65/336*** | (2006.01) |
| ***C09J 125/16*** | (2006.01) |
| ***C09J 133/00*** | (2006.01) |
| ***C09J 145/00*** | (2006.01) |
| ***C09J 171/02*** | (2006.01) |
| ***C09J 175/08*** | (2006.01) |
| ***C09J 183/08*** | (2006.01) |
| ***C09J 193/04*** | (2006.01) |

(52) U.S. Cl.

CPC ........ *C09J 171/02* (2013.01); *C08G 18/4825* (2013.01); *C08G 18/778* (2013.01); *C09J 125/16* (2013.01); *C09J 133/00* (2013.01); *C09J 145/00* (2013.01); *C09J 175/08* (2013.01); *C09J 193/04* (2013.01); *C08G 65/336* (2013.01)

(58) Field of Classification Search

CPC ....... C09J 175/08; C08L 23/00; C08F 230/08; C08F 232/06

See application file for complete search history.

(56) References Cited

U.S. PATENT DOCUMENTS

| | | | | |
|---|---|---|---|---|
| 2011/0052912 A1 | | 3/2011 | Poivet et al. | |
| 2011/0151253 A1 | | 6/2011 | Laferte et al. | |
| 2014/0039133 A1 | * | 2/2014 | Okamoto ............ | C09K 3/1018 525/409 |

FOREIGN PATENT DOCUMENTS

| | | | | |
|---|---|---|---|---|
| EP | 2336208 A1 | | 6/2011 |
| EP | 3176191 A1 | | 6/2017 |
| EP | 3480225 A2 | | 5/2019 |
| EP | 3521633 A1 | | 8/2019 |
| EP | 3647333 A1 | | 5/2020 |
| JP | 2017218526 A | * | 12/2017 |
| WO | 2008107331 A1 | | 9/2008 |
| WO | 2009106699 A2 | | 9/2009 |

OTHER PUBLICATIONS

JP2017218526 Espacenet Translation (Year: 2017).*

* cited by examiner

*Primary Examiner* — Marc S Zimmer
*Assistant Examiner* — Virginia L Stonehocker
(74) *Attorney, Agent, or Firm* — Rimon P.C.; Allyn B. Elliott

(57) ABSTRACT

A heat-crosslinkable adhesive composition comprises a polymer (A) comprising at least one hydrolysable alkoxysilane group, a silylated copolymer tackifying resin (B'), a non-silylated tackifying resin (C), and a crosslinking catalyst (D). The silylated copolymer tackifying resin comprises a repeating unit (B'1) derived from a silylated olefin monomer, in particular from a silylated (meth)acrylate monomer, and one or more repeating units (B'2) derived from olefin or diolefin monomers included in a petroleum fraction obtained by cracking naphtha and chosen from a C5 fraction, a C9 fraction, dicyclopentadiene. A self-adhesive article comprises a support layer coated with a self-adhesive layer consisting of the heat-crosslinkable adhesive composition in the crosslinked state.

17 Claims, 1 Drawing Sheet

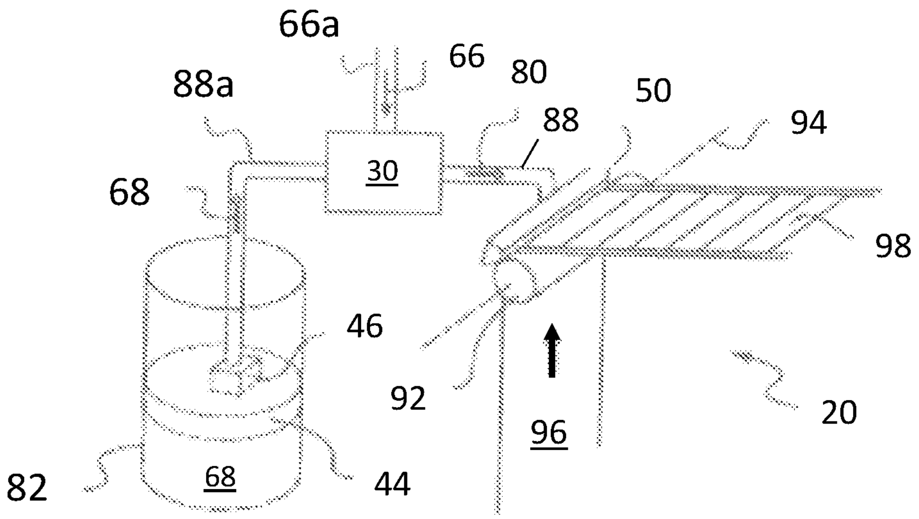
66a
66
80
88a
88
50
94
68
30
98
46
92
20
96
82
68
44

HEAT-CROSSLINKABLE ADHESIVE COMPOSITION FORMING A HEAT-STABLE ADHESIVE SEAL

FIELD OF THE INVENTION

The present invention relates to a novel heat-crosslinkable adhesive composition based on a polymer comprising at least one hydrolysable alkoxysilane group. The invention also relates to a self-adhesive article that is capable of forming, after assembly with a substrate, an adhesive seal whose cohesion is maintained at high temperature. The invention notably relates to a self-adhesive support which comprises a support layer coated with a self-adhesive layer consisting of said composition in the crosslinked state. Finally, the invention relates to a process for manufacturing said article.

TECHNICAL BACKGROUND

Self-adhesive bonding agents (also known as pressure-sensitive adhesives (PSAs)) are substances which give the support layer which is coated therewith an immediate tack at ambient temperature. This immediate tackiness, often denoted by the term “tack”, enables the instantaneous adhesion of said self-adhesive support to all types of substrates, under the effect of a gentle and brief pressure. Due to its adhesive power, usually evaluated by a peel test, said self-adhesive support is then firmly attached to said substrate by means of an adhesive seal.

PSAs are widely used in the manufacture of self-adhesive articles, for instance self-adhesive labels which are attached to articles for purposes of presentation of information (such as a barcode, name or price) and/or for decorative purposes, whether during permanent or temporary adhesive bonding operations.

Another example of self-adhesive articles are self-adhesive tapes for various uses. Mention may be made, for example, besides the transparent adhesive tape widely used in daily life, of: the forming and assembling of cardboard packagings; the protection of surfaces for painting operations, in construction; the fixing and maintenance of various elements, such as panels, bricks, protruding objects, in the construction of buildings or edifices; the fixing and maintenance of metal, plastic or glass parts, which are flat or which have specific profiles, such as electric cables, plastic films, window panes, metal sheets, inscriptions, logos, parts of seats, dashboards, plastic or textile walls, tubes or pipes for the circulation of fluids, notably in the transportation industry; the adhesive bonding of fitted carpets by double-sided adhesive tapes in the building sector.

For the purpose of manufacturing these self-adhesive articles, self-adhesive bonding agents are generally applied by continuous coating processes over the entire surface of a large-sized support layer (where appropriate a printable support), in an amount (generally expressed in $g/m^2$) denoted below by the term “weight per unit area”. The support layer is, for example, paper or a film consisting of a polymeric material having one or more layers. The layer of self-adhesive composition which covers the support layer can itself be covered with a protective non-stick layer (often known as a release liner), for example consisting of a silicone film. The multilayer system obtained is generally packaged by winding in the form of large reels having a width of up to 2 m and a diameter of up to 1 m, which can be stored and transported.

These multilayer systems can subsequently be converted into self-adhesive labels which can be applied by the final user, by means of transformation processes which include the printing of the desired informative and/or decorative elements onto the printable face of the support layer, followed by cutting to the desired shape and sizes. The protective non-stick layer can be easily removed without modifying the adhesive layer, which remains attached to the support layer. After separation from its non-stick protective layer, the label is applied to the article to be coated either manually or with the aid of labelling machines on automated packaging lines.

These multilayer systems may also be converted into self-adhesive tapes by cutting and packaging as rolls of given widths and lengths with cutting or pre-cutting of particular shapes that are useful for their final use, for instance for the assembly of parts of variable size and of variable shape, in the electronics industry, whether for industrial applications or for consumer purposes.

Heat-crosslinkable adhesive compositions comprising a hydrolysable alkoxysilane-terminated polyurethane (or polyether) are already known, notably from Bostik patent applications WO 09/106699 and EP2336208.

The coating of these adhesive compositions, at a certain weight per unit area, on a support layer and heating leads, after a chemical crosslinking reaction in the presence of moisture, to the production of a self-adhesive support which has the required adhesive power (or peel) and tack properties. This crosslinking reaction leads to the formation of an adhesive seal which has a three-dimensional polymer network structure comprising siloxane bonds and which ensures the fixing of the self-adhesive support to the substrate. Said self-adhesive support may thus be used for the manufacture of self-adhesive articles such as self-adhesive labels and/or tapes.

The self-adhesive support included in the self-adhesive articles described previously can thus be firmly attached to a substrate by means of an adhesive seal, to form an assembly. Maintenance of the cohesion of the adhesive seal over time consequently determines the stability of the assembly formed by the fixing of the self-adhesive support to the substrate.

However, there are many fields of application of PSAs for which there is a need for the cohesion of the adhesive seal to be maintained when said seal (and consequently also the assembly) is exposed to a temperature that is liable to vary over a wide range, notably at high temperature.

Such a need arises, for example, in the transport industry, including the aeronautical, aerospace, automotive, railway and marine industries, where heat-resistance properties of assemblies including adhesive seals are required together with related flame retardant properties, notably for assemblies positioned in the vicinity of engines. A practical example that may be mentioned is the application of labels to certain components located in the vicinity of the engine, or onto articles (such as tyres) which are labelled while hot on leaving the production line. Mention may also be made of the use of self-adhesive tapes in the case, for example, of the interior trim of aircraft or other vehicles. Finally, mention may be made of the assembly of battery components for electric or hybrid cars, since the recharging a battery is also accompanied by an increase in temperature.

Such a need also arises in a whole host of industrial sectors (such as household appliances, electronics or solar panels) where adhesives are increasingly seen as an alternative to the durable assembly obtained by rivets or by spot welding. Another practical example is PSAs used in the application of labels onto packages designed to receive a hot liquid during their packaging.

The abovementioned patent application WO 09/106699 describes a heat-crosslinkable adhesive composition which meets the above need and which comprises an alkoxysilane-terminated polyurethane, a compatible tackifying resin and a crosslinking catalyst.

One object of the present invention is to provide a heat-crosslinkable adhesive composition whose coating onto a support layer leads, after crosslinking by heating, to a self-adhesive support that is capable of forming an adhesive seal which has improved cohesion at high temperature, resulting in seal maintenance that is also improved.

Another object of the present invention is to provide a heat-crosslinkable adhesive composition which, after coating at a high weight per unit area onto the support layer and crosslinking, also leads to an adhesive seal which has improved cohesion at high temperature.

Another object of the present invention is to provide a heat-crosslinkable adhesive composition which leads, after coating onto a support followed by crosslinking, to a pressure-sensitive adhesive which has suitable peel and tack properties.

It has now been found that these aims can be totally or partly achieved by means of the adhesive composition and of the self-adhesive support which are described hereinbelow.

A subject of the present invention is thus, firstly, a heat-crosslinkable adhesive composition comprising:

- a polymer (A) comprising at least one hydrolysable alkoxysilane group;
- a silylated tackifying resin (B) chosen from a silylated copolymer resin (B') and a silylated copolymer resin (B"):
  - said resin (B') comprising:
    - a repeating unit (B'1) derived from a silylated olefin monomer, in particular derived from a silylated (meth)acrylate monomer; and
    - one or more repeating units (B'2) derived from olefin or diolefin monomers included in a petroleum fraction obtained by cracking naphtha and chosen from a C5 fraction, a C9 fraction, dicyclopentadiene and mixtures thereof; and
  - said resin (B") being obtained by hydrogenation of the resin (B');
- a non-silylated tackifying resin (C) that is compatible with the polymer (A); and
- a crosslinking catalyst (D).

Polymer (A):

The heat-crosslinkable adhesive composition according to the invention comprises one or more polymers (A) comprising at least one hydrolysable alkoxysilane group.

For the purposes of the present invention, the term "polymer (A) comprising at least one hydrolysable alkoxysilane group" means a polymer which comprises at least one, and preferably at least two, hydrolysable groups of formula (I):

$$—Si(R^4)_p(OR^5)_{3-p} \quad (I)$$

in which:

- $R^4$ represents a linear or branched alkyl radical comprising from 1 to 4 carbon atoms, with the possibility that when there are several radicals $R^4$, these radicals are identical or different;
- $R^5$ represents a linear or branched alkyl radical comprising from 1 to 4 carbon atoms, with the possibility that when there are several radicals $R^5$, these radicals are identical or different, with the possibility that two groups $OR^5$ may be engaged in the same ring; and
- p is an integer equal to 0, 1 or 2.

The hydrolysable alkoxysilane group is preferably in the terminal position of said polymer. A position in the middle of the chain is, however, not excluded.

The various groups, radicals and letters that are included in the formulae described in the present patent application retain the same definitions throughout the present text, unless otherwise indicated.

The polymer (A) is thus a silylated polymer which is generally in the form of a more or less viscous liquid. Preferably, the polymer (A) has a viscosity ranging from 10 to 200 Pa·s, preferably ranging from 20 to 175 Pa·s, said viscosity being measured, for example, according to a Brookfield-type method at 23° C. and 50% relative humidity (S28 needle). More generally, the viscosities that are indicated in the present text are, unless otherwise indicated, viscosities measured by means of a method of Brookfield type.

According to a preferred variant of the composition according to the invention, the hydrolysable alkoxysilane group of formula (I) is such that p is equal to 1 or 2, and more preferentially p is equal to 1.

The polymer (A) preferably comprises two groups of formula (I), but it may also comprise from three to six groups of formula (I).

Preferably, the polymer(s) (A) have a number-average molar mass ranging from 500 to 60000 g/mol, for example ranging from 1000 to 30000 g/mol, more preferably ranging from 15000 to 50000 g/mol, more preferentially ranging from 15000 to 30000 g/mol.

Unless otherwise indicated, the number-average molar (or molecular) mass (Mn) and the weight-average molar (or molecular) mass (Mw) indicated in the present text, notably for the polymer (A), for the silylated tackifying resin (B) and for the non-silylated tackifying resin (C), are measured by size exclusion chromatography, also called gel permeation chromatography (GPC), using a polystyrene standard.

According to one embodiment of the invention, polymer (A) corresponds to one of the formulae (II), (III) or (IV):

$$P\left[O—\underset{\underset{O}{\|}}{C}—NH—R^3—Si(R^4)_p(OR^5)_{3-p}\right]_f \quad (II)$$

$$P\left[O—R^3—Si(R^4)_p(OR^5)_{3-p}\right]_f \quad (III)$$

$$P\left[O—\underset{\underset{O}{\|}}{C}—NH—R^3—NH—\underset{\underset{O}{\|}}{C}—X—R^3—Si(R^4)_p(OR^5)_{3-p}\right]_f$$

in which:

- $R^4$, $R^5$ and p have the same meaning as in formula (I) described above,
- P represents a saturated or unsaturated, linear or branched polymeric radical optionally comprising one or more heteroatoms, such as oxygen, nitrogen, sulfur or silicon, and preferably having a number-average molar mass ranging from 500 g/mol to 60000 g/mol, for example from 1000 g/mol to 30000 g/mol, more particularly from 15000 g/mol to 50000 g/mol, more preferentially from 15000 g/mol to 30000 g/mol, $R^1$ represents a divalent hydrocarbon-based radical comprising from 5 to 15 carbon atoms, which may be aromatic or aliphatic, linear, branched or cyclic, $R^3$ represents a linear or branched divalent alkylene radical comprising from 1 to 6 carbon atoms, preferably from 1 to 3 carbon atoms, X represents a divalent radical chosen from —NH—, —$NR^7$— or —S—, $R^7$ represents a linear or branched alkyl radical comprising from 1 to 20 carbon atoms and which may also comprise one or more heteroatoms, and f is an integer ranging from 1 to 6, preferably ranging from 2 to 5, preferably from 2 to 4, more preferably from 2 to 3.

Preferably, in formulae (II), (III) and/or (IV) above, P represents a polymeric radical chosen, in a non-limiting manner, from polyethers, polycarbonates, polyesters, polyacrylates, polyureas, polyether polyurethanes, polyester polyurethanes, polyolefin polyurethanes, polyacrylate polyurethanes, polycarbonate polyurethanes, and block polyether/polyester polyurethanes.

For example, EP 2468783 describes silylated polymers of formula (II) in which P represents a polymeric radical containing polyurethane/polyester/polyether blocks.

According to one embodiment, the silylated polymers are chosen from silylated polyurethanes, silylated polyethers, and mixtures thereof.

According to a particular embodiment, the silylated polymer (A) corresponds to one of the formulae (II'), (III') or (IV'):

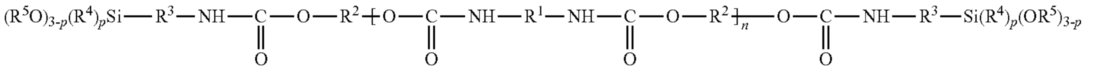

(II')

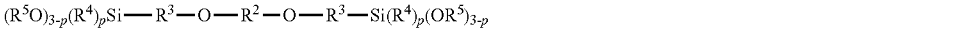

(III')

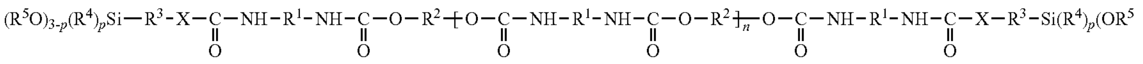

(IV')

in which:

$R^1$, $R^3$, $R^4$, $R^5$, X, $R^7$ and p have the same meaning as in formulae (II), (III) and (IV) described above, $R^2$ represents a saturated or unsaturated, linear or branched divalent hydrocarbon-based radical optionally comprising one or more heteroatoms, such as oxygen, nitrogen, sulfur or silicon, and preferably having a number-average molar mass ranging from 500 g/mol to 60000 g/mol, for example from 1000 g/mol to 30000 g/mol, more particularly from 15000 g/mol to 50000 g/mol, more preferentially from 15000 g/mol to 30000 g/mol, and n is an integer greater than or equal to 0.

In the silylated polymers of formulae (II'), (III') or (IV') defined above, when the radical $R^2$ comprises one or more heteroatoms, said heteroatom(s) are not present at the end of the chain. In other words, the free valencies of the divalent radical $R^2$ bonded to the oxygen atoms neighbouring the silylated polymer each originate from a carbon atom. Thus, the main chain of the radical $R^2$ is terminated with a carbon atom at each of the two ends, said carbon atom then having a free valency.

According to one embodiment, the silylated polymers (A) are obtained from polyols chosen from polyether polyols, polyester polyols, polycarbonate polyols, polyacrylate polyols, polysiloxane polyols and polyolefin polyols, and mixtures thereof, and more preferably from diols chosen from polyether diols, polyester diols, polycarbonate diols, polyacrylate diols, polysiloxane diols, polyolefin diols, and mixtures thereof. In the case of the polymers of formula (II'), (III') or (IV') described above, such diols may be represented by the formula HO—$R^2$—OH where $R^2$ has the same meaning as in formula (II'), (III') or (IV').

For example, among the radicals of the type $R^2$ which may be present in formula (II'), (III') or (IV'), mention may be made of the following divalent radicals, of which the formulae below show the two free valencies:

derived from a polypropylene glycol:

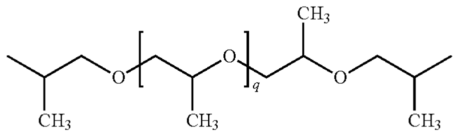

derived from a polyester diol:

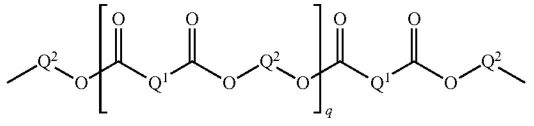

derived from a polybutadiene diol:

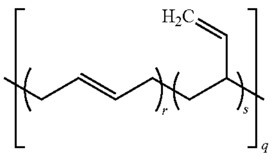

derived from a polyacrylate diol:

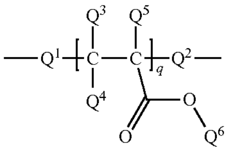

derived from a polysiloxane diol:

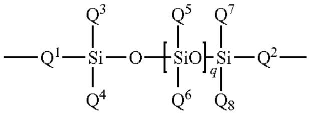

In the above formulae, the radicals and indices have the following meanings:

q represents an integer such that the number-average molecular mass of the radical $R^2$ ranges from 500 g/mol to 60000 g/mol, for example from 1000 g/mol to 30000 g/mol, preferably from 15000 g/mol to 50000 g/mol, more preferentially from 15000 g/mol to 30000 g/mol, r and s represent zero or a non-zero integer such that the number-average molecular mass of the radical $R^2$ ranges from 500 g/mol to 60000 g/mol, for example from 1000 g/mol to 30000 g/mol, preferably from 15000 g/mol to 50000 g/mol, more preferentially from 15000 g/mol to 30000 g/mol, it being understood that the sum r+s is other than zero, $Q^1$ represents a linear or branched, saturated or unsaturated aromatic or aliphatic divalent alkylene radical preferably containing from 1 to 18 carbon atoms, more preferably from 1 to 8 carbon atoms, $Q^2$ represents a linear or branched divalent alkylene radical preferably containing from 2 to 36 carbon atoms, more preferably from 1 to 8 carbon atoms, $Q^3$, $Q^4$, $Q^5$, $Q^6$, $Q^7$ and $Q^8$ represent, independently of each other, a hydrogen atom or an alkyl, alkenyl or aromatic radical preferably containing from 1 to 12 carbon atoms, preferably from 2 to 12 carbon atoms, more preferably from 2 to 8 carbon atoms.

According to one embodiment of the composition according to the invention, the silylated polymer (A) is such that the radical $R^2$ which appears in formulae (II'), (III') and (IV') represents a polyether radical, preferably a poly(oxyalkylene) radical, and even more preferably a radical derived from a polypropylene glycol corresponding to the formula indicated above.

According to one embodiment, $R^1$ is chosen from one of the following divalent radicals, of which the formulae below reveal the two free valencies:

a) the divalent radical derived from isophorone diisocyanate (IPDI):

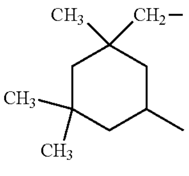

b) the divalent radical derived from dicyclohexylmethane diisocyanate (H12MDI)

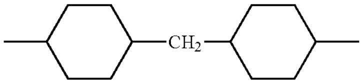

c) the divalent radical derived from toluene diisocyanate (TDI)

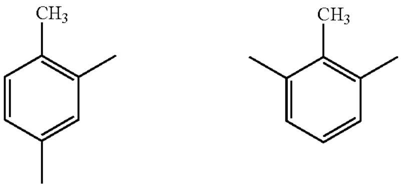

d) the divalent radicals derived from the 4,4' and 2,4' isomers of diphenylmethane diisocyanate (MDI)

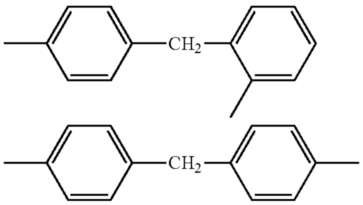

e) the divalent radical derived from hexamethylene diisocyanate (HDI) $-(CH_2)_6-$ f) the divalent radical derived from m-xylylene diisocyanate (m-XDI).

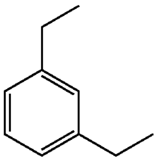

The polymers of formula (II) or (II') may be obtained according to a process described in EP 2336208 and WO 2009/106699. A person skilled in the art will know how to adapt the manufacturing process described in these two documents in the case of the use of different types of polyols. Among the polymers corresponding to formula (II), mention may be made of:

GENIOSIL® STP-E10 (available from WACKER): polyether comprising two groups (I) of dimethoxy type (n equal to 0, p equal to 1 and $R^4$ and $R^5$ represent a methyl group) having a number-average molar mass of 17000 g/mol where $R^3$ represents a methyl group;

GENIOSIL® STP-E30 (available from WACKER): with a number-average molar mass of 24000 g/mol, this is a polypropylene glycol with two end groups consisting of a dimethoxy(methyl)silylmethyl carbamate, i.e. in formula (II'): n is equal to 0; p is equal to 1; $R^4$ and $R^5$ represent a methyl group and $R^3$ represents a methyl group;

DESMOSEAL® S XP 2636 (available from BAYER): polyurethane comprising two groups (I) of trimethoxy type (n other than 0, p equal to 0 and $R^5$ represents a methyl group) having a number-average molar mass of 27900 g/mol where $R^3$ represents an n-propylene group.

The polymers of formula (III) or (III') may be obtained by hydrosilylation of polyether diallyl ether according to a process described, for example, in EP 1 829 928. Among the polymers corresponding to formula (III), mention may be made of:

the polymer MS SAX 510 (available from Kaneka) corresponding to a polyether comprising two groups (I) of trimethoxy type (p equal to 0 and $R^5$ represent a methyl group) having a number-average molar mass of about 22200 g/mol;

the polymer MS S303H (available from Kaneka) corresponding to a polyether comprising at least two groups (I) of dimethoxy type (p is equal to 1 and $R^4$ represents a methyl group) having a number-average molecular mass of about 16000 g/mol.

The polymers of formula (IV) or (IV') may be obtained, for example, by reaction of polyol(s) with one or more diisocyanates followed by a reaction with aminosilanes or mercaptosilanes. A process for preparing polymers of formula (IV) or (IV') is described in EP 2 583 988. A person skilled in the art will know how to adapt the manufacturing process described in said document in the case of using different types of polyols. Among the polymers corresponding to formula (IV), mention may be made of:

SPUR+® 1050MM (available from MOMENTIVE): polyurethane comprising two groups (I) of trimethoxy type (n other than 0, p equal to 0 and $R^5$ represents a methyl group) having a number-average molar mass of 8475 g/mol where $R^3$ represents an n-propyl group;

SPUR+® Y-19116 (available from MOMENTIVE): polyurethane comprising two groups (I) of trimethoxy type (n other than 0 and $R^5$ represents a methyl group) having a number-average molar mass of 22000 g/mol where $R^3$ represents an n-propyl group.

According to a preferred embodiment of the invention, the adhesive composition comprises at least one silylated polymer of formula (II) and/or (II') or at least one silylated polymer of formula (III) and/or (III').

According to a most particularly preferred embodiment of the invention, polymer (A) is a silylated polymer of formula (II') in which n is equal to 0 and $R^2$ is a divalent radical derived from a polyether, preferably from a poly(oxyalkylene) diol and even more particularly from a polypropylene glycol.

Silylated Copolymer Resin (B):

The heat-crosslinkable adhesive composition according to the invention also comprises a silylated tackifying resin (B) chosen from a silylated copolymer resin (B') and a silylated copolymer resin (B"):

said resin (B') comprising:

a repeating unit (B'1) derived from a silylated olefin monomer, in particular from a silylated (meth)acrylate monomer; and one or more repeating units (B'2) derived from olefin or diolefin monomers included in a petroleum fraction obtained by cracking naphtha and chosen from a C5 fraction, a C9 fraction, dicyclopentadiene and mixtures thereof; and said resin (B") being obtained by hydrogenation of the resin (B').

The term "silylated olefin" means a compound comprising at least one carbon-carbon double bond, preferably of vinyl type ($CH_2$═CH—), and at least one silicon atom bonded directly to at least one carbon atom. Preferably, the silylated olefin comprises exactly one carbon-carbon double bond, preferably of vinyl type, and exactly one silicon atom directly bonded to at least one carbon atom.

It is understood that several silylated tackifying resins (B) as defined previously may be used, notably a mixture of the resins (B') and (B") as defined previously.

According to a preferred variant, the silylated copolymer resin (B) is the resin (B') as defined previously.

The silylated olefin, in particular the silylated (meth) acrylate, from which the repeating unit (B'1) is derived preferably comprises at least one alkoxysilyl group. Said alkoxysilyl group may comprise one or more heteroatoms, preferably oxygen, other than the oxygen directly bonded to the silicon atom. Preferably, said alkoxysilyl group does not comprise any heteroatoms other than the oxygen directly bonded to the silicon atom.

According to a preferred embodiment, the silylated olefin is represented by the formula:

$$CH_2{=}CH(R^{10})—(C(O)O)_a—(C_mH_{2m})_b—Si(R^{11})(R^{12})(R^{13})$$

in which:

$R^{10}$ represents a hydrogen atom or a methyl group, $R^{11}$, $R^{12}$ and $R^{13}$, which may be identical or different, each represent a hydrogen atom or an organic group chosen from an alkyl group comprising from 1 to 20 carbon atoms, a cycloalkyl group comprising from 3 to 12 carbon atoms, an alkoxy group comprising from 1 to 12 carbon atoms, an acyloxy group comprising from 2 to 12 carbon atoms an aryloxy group comprising from 6 to 30 carbon atoms and an amino group comprising from 1 to 20 carbon atoms; preferably, $R^{11}$, $R^{12}$ and $R^{13}$, which may be identical or different, each represent an alkyl group comprising from 1 to 6 carbon atoms or an alkoxy group comprising from 1 to 6 carbon atoms, a and b, which may be identical or different, are integers equal to 0 or 1, m is an integer between 1 and 12 and preferably between 1 and 6, it being understood that at least one of the radicals $R^{11}$, $R^{12}$ and $R^{13}$ represents an alkoxy group comprising from 1 to 12 carbon atoms, preferably 1 to 6 carbon atoms (in particular comprising 1 carbon atom).

Preferably, the silylated olefin is represented by the formula:

$$CH_2{=}CH(R^{10})—(C(O)O)_a—(C_mH_{2m})_b—Si(R^{11})(R^{12})(R^{13})$$

in which:

$R^{10}$ represents a hydrogen atom or a methyl group, $R^{11}$, $R^{12}$ and $R^{13}$, which may be identical or different, each represent an alkyl group comprising from 1 to 6 carbon atoms or an alkoxy group comprising from 1 to 6 carbon atoms, a and b, which may be identical or different, are integers equal to 0 or 1, m is an integer between 1 and 6, it being understood that at least one of the radicals $R^{11}$, $R^{12}$ and $R^{13}$ represents an alkoxy group comprising from 1 to 6 carbon atoms (in particular comprising 1 carbon atom).

Such a silylated olefin, in particular silylated (meth) acrylate, is preferably chosen from vinyltrimethoxysilane, vinyltriethoxysilane, tris(2-methoxyethoxy)vinylsilane and 3-(trimethoxysilyl)propyl methacrylate, for example vinyltrimethoxysilane.

The silylated copolymer resin (B') preferably comprises several repeating units (B'2) derived from cyclic or acyclic olefins which are included in the petroleum fractions obtained by cracking naphtha. These petroleum fractions are chosen from a C5 fraction, a C9 fraction, dicyclopentadiene and mixtures thereof.

The C5 fraction may include olefins such as 1-pentene, 2-methyl-2-butene, n-pentane, propadiene, dicyclopentadiene, piperylene, isoprene, cyclopentene and 1,3-pentadiene.

The C9 fraction may include olefins such as styrene, vinyltoluene, indene, α-methylstyrene, benzene, toluene and xylene.

In addition to the repeating units (B'1) and (B'2) described above, the silylated copolymer resin (B') may also comprise another repeating unit derived from a monomer chosen, for example, from a cyclic anhydride, a C3-C20 α-olefin, or a styrene derivative.

The silylated copolymer resin (B') may be prepared by a copolymerization reaction of the monomers corresponding notably to the repeating units (B'1) and (B'2), said copolymerization reaction corresponding to an addition reaction between the double bonds present in each of the monomers. Numerous polymerization methods can be used for this purpose, thermal polymerization being more particularly preferred. Said copolymerization reaction may also be followed by a hydrogenation reaction, the product of which is the silylated copolymer resin (B").

Reference is made to patent applications EP3176191, EP3480225, EP3521633 and EP3647333 for more detailed information regarding the description of the silylated copolymer resin (B') and its preparation.

According to a preferred variant, the silylated copolymer resin (B) has a number-average molecular mass (Mn) of between 100 and 5000 g/mol, preferably between 150 and 2000 g/mol, even more preferentially between 150 and 500 g/mol.

According to another preferred variant, the silylated tackifying resin (B) has a softening temperature of between 70° C. and 150° C.

The softening temperature is determined in accordance with the standardized ASTM E 28 test, the principle of which is as follows. A brass ring with a diameter of approximately 2 cm is filled with the resin to be tested, in the melted state. After cooling to room temperature, the ring and the solid resin are placed horizontally in a thermostatically maintained glycerol bath with a temperature which can vary by 5° C. per minute. A steel ball with a diameter of approximately 9.5 mm is centred on the disk of solid resin. The softening temperature is the temperature, during the phase of temperature increase of the bath at a rate of 5° C. per minute, at which the disk of resin yields by a height of 25.4 mm under the weight of the ball.

Among the resins that can be used as silylated tackifying resin (B), mention may be made of the resin Mkorez® HRR-100, which is a (non-hydrogenated) resin (B') available from the company Kolon Inc. with a number-average molecular mass (Mn) of 334 g/mol and a softening temperature of 100° C.

Non-Silylated Tackifying Resin (C):

The heat-crosslinkable adhesive composition according to the invention also comprises one (or more) non-silylated tackifying resin (C) that is compatible with the polymer(s) (A).

Said resin (C) may be any resin that is compatible with the polymer(s) (A).

The term "compatible tackifying resin" denotes a tackifying resin which, when mixed in 50%/50% proportions with the polymer(s) (A) of formula (I), gives a substantially homogeneous mixture.

The resins (C) are advantageously chosen from:

(i) resins obtained by polymerization of terpene hydrocarbons and of phenols, in the presence of Friedel-Crafts catalysts;
(ii) resins obtained by a process comprising the polymerization of α-methylstyrene, it also being possible for said process to comprise a reaction with phenols;
(iii) rosins of natural origin (for instance the rosin extracted from pine gum, wood rosin extracted from tree roots) and derivatives thereof which are hydrogenated, dimerized, polymerized or esterified with monoalcohols or polyols (such as glycerol or pentaerythritol);
(iv) resins obtained by hydrogenation, polymerization or copolymerization (with an aromatic hydrocarbon) of mixtures of unsaturated aliphatic hydrocarbons containing 5, 9 or 10 carbon atoms obtained from petroleum fractions;
(v) terpene resins (generally resulting from the polymerization of terpene hydrocarbons, for instance monoterpene (or pinene), in the presence of Friedel-Crafts catalysts);
(vi) copolymers based on natural terpenes (for instance styrene/terpene, α-methylstyrene/terpene and vinyltoluene/terpene); or
(vii) acrylic resins having a viscosity at 100° C. of less than 100 Pa·s;

and also from mixtures of these resins.

Such resins are commercially available and, among those of types (i), (ii), (iii) and (iv) defined above, mention may be made of the following products:

- resins of type (i): Dertophene® 1510, available from the company DRT, having a molar mass Mn of about 870 Da; Dertophene® H150, available from the same company, having a molar mass Mn equal to about 630 Da; Dertophene® T105 available from the same company, with a molar mass Mw of about 700 Da; Sylvarez® TP 95, available from the company Arizona Chemical, having a molar mass Mn of about 1200 Da;
- resins of type (ii): Cleartack® W100, available from the company Cray Valley, which is obtained by polymerization of α-methylstyrene without the action of phenols, with a number-average molar mass of 900 Da; Sylvarez® 510, which is also available from the company Arizona Chemical, with a molar mass Mn of about 1740 Da, the process for the production of which also comprises the addition of phenols;
- resins of type (iii): Sylvalite® RE 100, which is an ester of rosin and pentaerythritol available from the company Arizona Chemical and with a molar mass Mn of about 1700 Da;
- resins of type (iv): Picco® AR100 available from the company Eastman and with a molar mass Mn of about 550 g/mol.

According to a preferred variant, a resin chosen from those of type (i) or (iv) is used as non-silylated tackifying resin (C).

Crosslinking Catalyst (D):

The heat-crosslinkable adhesive composition according to the invention also comprises one (or more) crosslinking catalyst (D).

Said catalyst may be any catalyst known to a person skilled in the art for the condensation of silanol.

The crosslinking catalyst (D) may be chosen from the group consisting of:

(D1) organometallic compounds, (D2) amines, and (D3) acids and derivatives thereof, and also mixtures thereof.

It may also be a mixture of catalysts belonging to the same group (D1), (D2) or (D3) (for example a mixture of several amines), or a mixture of catalysts belonging to at least two different groups chosen from the groups (D1), (D2) and (D3) (for example a mixture of an amine and of an organometallic compound).

In the context of the invention, the term "organometallic compounds" means compounds comprising an organic radical and at least one metal. In the context of the invention, the term "organic radical" means a radical comprising at least one carbon atom.

(D1) Organometallic Compounds:

The organometallic compounds may comprise organometallic compounds (compounds comprising at least one metal-carbon covalent bond), metal alkoxides, metal carboxylates, and metallic coordination complexes with one or more organic ligands.

Examples of organic ligands that may be mentioned include acetylacetonate and oximes.

The metal atom of the organometallic compounds may be any metal atom known to those skilled in the art, and may be chosen in particular from tin, aluminium, zinc, cobalt, iron, nickel, bismuth, titanium, or zirconium. The organometallic compounds may moreover comprise several metal atoms.

Compounds Comprising at Least One Metal-Carbon Covalent Bond:

The compounds comprising at least one metal-carbon covalent bond (organometallic compounds) may be carboxylates of organometallic compounds chosen from the group consisting of dibutyltin dilaurate (DBTL), dibutyltin diacetate, dibutyltin diethylhexanoate, dioctyltin dineodecanoate (available, for example, under the name TIB KAT® 223 from the company TIB Chemicals), dibutyltin dioleate, dibutyltin benzylmaleate, diphenyltin diacetate, and mixtures thereof.

The metal alkoxides may be chosen from the group consisting of titanium tetrabutoxide, titanium tetraisopropoxide, zirconium tetrabutoxide, zirconium tetraisopropoxide, and mixtures thereof.

The metal carboxylates may be chosen from the group consisting of zinc 2-ethylcaproate, zinc diacetate, zinc dineodecanoate, zinc diundecenoate, zinc dimethacrylate, cobalt acetylacetonate, cobalt diacetate, iron acetylacetonate, iron diacetate, nickel acetylacetonate, nickel diacetate, bismuth acetate, bismuth trioctanoate, bismuth dineodecanoate, zinc bismuth dineodecanoate, and mixtures thereof.

The metal coordination complexes with one or more organic ligands may be chosen from the group consisting of zinc acetylacetonate, titanium acetylacetonate (commercially available, for example, under the name Tyzor® AA75 from the company Dorf Ketal), titanium tetraacetylacetonate, aluminium trisacetylacetonate, aluminium chelates, for instance bis(ethyl acetoacetate) monoacetylacetonate (commercially available, for example, under the name K-KAT® 5218 from the company King Industries), zirconium tetraacetylacetonate, diisopropoxybis(ethylacetonato)titanium, and mixtures thereof.

(D2) Amines:

The amines may be primary amines, secondary amines or tertiary amines.

Preferably, the amines are chosen from the group consisting of triethylamine, tributylamine, tetramethylguanidine, 1,8-diazabicyclo[5.4.0]-7-undecene, 1,4-diazabicyclo[2.2.2]octane, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, and mixtures thereof.

(D3) Acid Catalysts and Derivatives Thereof:

The acid catalysts may be chosen from inorganic acid catalysts, organic acid catalysts, and mixtures thereof.

Among the inorganic acid catalysts, examples that may be mentioned include phosphoric or orthophosphoric acid, phosphorous acid, hypophosphorous acid, or sulfuric acid.

The organic acid catalysts may be chosen from sulfonic acids, carboxylic acids, organophosphate acids, organophosphonate acids, phosphonic acids, and mixtures thereof.

Preferably, the organic and inorganic acid catalysts have a pKa of less than or equal to 6, preferably less than or equal to 4, advantageously less than or equal to 2, advantageously less than or equal to 0.

The sulfonic acids may be aliphatic or aromatic, optionally substituted (for example substituted with at least one substituent chosen from halogens (such as fluorine), hydroxyls, alkyls, amines, and mixtures thereof), and may be mono- or disulfonic.

The sulfonic acids may be chosen from N-alkylaminoalkylsulfonic acids and N,N-dialkylaminoalkylsulfonic acids (zwitterions), for instance 2-(N-morpholino)ethanesulfonic acid, 3-(N-morpholino)propanesulfonic acid, 4-[N-morpholino]butanesulfonic acid, 1,4-piperazinediethanesulfonic acid, N-2-hydroxyethylpiperazine-N'-2-ethanesulfonic acid, 2-(N-morpholino)ethanesulfonic acid, N-morpholinomethanesulfonic acid, N-(2-hydroxyethyl)piperazine-N'-methanesulfonic acid, piperazine-N,N'-bis(methanesulfonic acid), cyclohexylaminomethanesulfonic acid, N-[tris(hydroxymethyl)methyl]aminomethanesulfonic acid, N,N-bis(2-hydroxyethyl)aminomethanesulfonic acid; para-toluenesulfonic acid; benzenesulfonic acid; methanesulfonic acid; dodecylbenzenesulfonic acid; dodecylbenzenedisulfonic acid; dinonylnaphthalenedisulfonic acid; dinonylnaphthalenesulfonic acid; trifluoromethylsulfonic acid; and mixtures thereof.

In particular, the sulfonic acids are chosen from paratoluenesulfonic acid, benzenesulfonic acid, methanesulfonic acid, dodecylbenzenesulfonic acid, dodecylbenzenedisulfonic acid, dinonylnaphthalenedisulfonic acid, dinonylnaphthalenesulfonic acid, trifluoromethylsulfonic acid, and mixtures thereof.

Among the carboxylic acid catalysts, examples that may be mentioned include malonic acid, succinic acid, maleic acid, oxalic acid, acetic acid, lactic acid, benzoic acid, citric acid, glycolic acid, and mixtures thereof.

In the context of the invention, and unless otherwise mentioned, the term "organophosphate acid" means a phosphoric acid ester comprising at least one —OH radical. For example, methyl phosphate is an organophosphate acid comprising two —OH radicals and has the following structure:

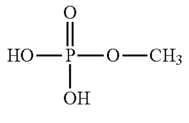

In particular, the organophosphate acids have the following formula:

$$(RO)_g—(P═O)—(OH)_h$$

in which:

R is an organic radical, in particular a radical chosen from linear or branched C1-C22 alkyls, cycloalkyls, aryls, and mixtures thereof (said alkyl, cycloalkyl and aryl groups being optionally substituted); and g and h are integers, with g+h=3 and h=1 or 2.

The organophosphate acids may be chosen, for example, from the group consisting of C1-C22 mono- or dialkyl phosphate acids and mixtures thereof, for instance butyl phosphate, dibutyl phosphate, bis(2-ethylhexyl) phosphate, 2-ethylhexyl phosphate, and mixtures thereof; mono- or diaryl phosphates, and mixtures thereof, for instance monophenyl phosphate, diphenyl phosphate and mixtures thereof; alkyl phenyl phosphates; and mixtures thereof.

In the context of the invention, and unless otherwise mentioned, the term "organophosphonate acid" means a phosphorus-based compound having the following general formula:

$$R'—(P═O)—(OH)(OR'')$$

in which R' and R" are organic radicals, preferably chosen, independently of each other, from linear or branched C1-C22 alkyls, cycloalkyls, aryls, and mixtures thereof (said alkyl, cycloalkyl and aryl groups being optionally substituted).

Among the organophosphonate acids, examples that may be mentioned include C1-C22 monoalkyl phosphonate acids.

In the context of the invention, and unless otherwise mentioned, the term "phosphonic acid" means a phosphorus-based compound having the following general formula:

$$R'''—(P═O)—(OH)_2$$

in which R''' is an organic radical, preferably chosen from linear or branched C1-C22 alkyls, cycloalkyls, aryls, and mixtures thereof (said alkyl, cycloalkyl and aryl groups being optionally substituted).

Among the phosphonic acids, examples that may be mentioned include N-alkylaminoalkylphosphonic acids (zwitterions), N,N-dialkylaminoalkylphosphonic acids (zwitterions), C1-C20 alkylphosphonic acids, for instance methylphosphonic acid, ethylphosphonic acid, propylphosphonic acid, butylphosphonic acid, t-butylphosphonic acid, isobutylphosphonic acid, hexylphosphonic acid, 2-ethylhexylphosphonic acid and linear or branched higher homologues, benzylphosphonic acid, phenylphosphonic acid, tolylphosphonic acid or xylylphosphonic acid.

Examples of organic acid catalysts that may be mentioned include Nacure® 155 (dinonylnaphthalenedisulfonic acid, containing 55% active material in isobutanol) sold by King Industries, Nacure® 1051 (dinonylnaphthalenesulfonic acid, containing 50% active material in 2-butoxyethanol) sold by King Industries, Nacure® 5076 (dodecylbenzenesulfonic acid, containing 70% active material in isopropanol) sold by King Industries, K-Cure® 1040 (para-toluenesulfonic acid, containing 40% active material in isopropanol) sold by King Industries, Nacure® 4000 (mixture of mono- and dialkyl phosphate acids, 100% active material) sold by King Industries.

The acid derivatives according to the invention may be acid anhydrides, acid esters or acid ammonium salts, the acid being as described above.

The acid derivatives are in particular "masked" or "latent" acids which advantageously make it possible to release the acid by thermal activation (for example at a temperature ranging from 70° C. to 170° C., preferably at a temperature ranging from 90° C. to 120° C.) or by hydrolysis, or by photoactivation, preferably by thermal activation. The masked acid advantageously makes it possible to release the acid which is the species having the catalytic activity. For example, the ammonium salt formed between aminomethylpropanol and para-toluenesulfonic acid is a masked acid (acid derivative) which, by thermal activation, releases the para-toluenesulfonic acid.

The acid derivatives may be prepared via any means known to those skilled in the art starting with the corresponding acid, for example by using typical acid/base reactions. For example, the process for making an ester typically involves the condensation of an acid compound with a compound comprising a hydroxyl group, for instance an alcohol, or with a compound of oxirane type. The ammonium salts may be prepared from any abovementioned acid, with ammonia or with a primary, secondary or tertiary amine. The amines may optionally comprise at least one functional group such as a hydroxyl group (alkanolamines), a C1-C4 alkyl group. The ammonium salts (zwitterions) may also be prepared by modifying the pH of a solution containing, for example, N-alkylaminoalkylphosphonic acids, N,N-dialkylaminoalkylphosphonic acids, N-alkylaminoalkylsulfonic acids or N,N-dialkylaminoalkylsulfonic acids.

Preferably, the catalyst is an ammonium salt of a sulfonic acid (the sulfonic acid being as described above), an ammonium salt of a phosphonic acid (the phosphonic acid being as described above), an ammonium salt of an organophosphonate acid (the organophosphonate acid being as described above), or an ammonium salt of an organophosphate acid (the organophosphate acid being as described above).

As amines for the preparation of the ammonium salts, examples that may be mentioned include 2-amino-2-methyl-1-propanol, triethylamine, aniline, pyridine, dimethylaminoethanol, alkypyridines, diisopropanolamine, dimethylethanolamine, triethanolamine, oxazolidines, bicyclic oxazolidines, amidines, diazabicyclooctanes, guanidines, N-alkylmorpholines, aminopyridines, aminoalkylpyridines, aminopyrrolidines, indazole, imidazole, pyrazole, pyrazine, pyrimidine, purine, imidazoline, pyrazoline, piperazine, aminomorpholine, aminoalkylmorpholines, and mixtures thereof. Preferably, the amines are tertiary amines.

Examples of acid derivatives that may be mentioned include Nacure® 3327 or Nacure® 3525 (dinonylnaphthalenedisulfonic acid masked with an amine, containing 25% active material in isopropanol and isobutanol) sold by King Industries, Nacure® 1557 or Nacure® 1953 (dinonylnaphthalenesulfonic acid masked with an amine, containing 25% active material in a mixture of butanol and 2-butoxyethanol) sold by King Industries, Nacure® 5225 or Nacure® 5528 or Nacure® 5925 (dodecylbenzenesulfonic acid masked with an amine, containing 25% active material in isopropanol) sold by King Industries, Nacure® 2107 or Nacure® 2500 (para-toluenesulfonic acid masked with an amine, containing 25% or 26% active material in isopropanol) sold by King Industries, Nacure® 2501 or Nacure® 2530 (para-toluenesulfonic acid masked with an amine, containing 25% active material in a mixture of isopropanol and methanol) sold by King Industries, Nacure® 4167 (dialkyl phosphate masked with an organic amine, containing 25% active material in a mixture of isopropanol and isobutanol) sold by King Industries, Nacure® 4575 (phosphate acid blocked with an amine, containing 25% active material in a mixture of methanol and butanol) sold by King Industries.

Preferably, the catalyst is chosen from the group consisting of organometallic compounds (in particular aluminium-based coordination complexes, and more particularly aluminium chelates), orthophosphoric acid, organophosphate acids (preferably C1-C22 mono- or dialkyl phosphate acid and mixtures thereof), ammonium salts (in particular of sulfonic acid or of organophosphate acid), and mixtures thereof.

Even more preferably, the catalyst is chosen from the group consisting of orthophosphoric acid, organophosphate acids (preferably C1-C22 mono- or dialkyl phosphate acid and mixtures thereof), ammonium salts (in particular of sulfonic acid or of organophosphate acid).

Other Additives:

The heat-crosslinkable adhesive composition according to the invention may also comprise one or more additives chosen from the group consisting of moisture absorbers, adhesion promoters, plasticizers, antioxidants, pigments, colorants, UV stabilizers, flame-retardant additives, fillers such as carbonate-based fillers, for example of calcium carbonate type, or a silsesquioxane resin or a polyvinyl ether compound.

The moisture absorber (or desiccant) may be chosen, for example, from non-polymeric hydrolysable alkoxysilane derivatives, with a molecular mass of less than 500 g/mol, preferably chosen from trimethoxysilane and triethoxysilane derivatives. Such an agent can typically extend the storage life of the composition during storage and transportation before it is used. Mention may be made, for example, of γ-methacryloxypropyltrimethoxysilane (for example available, under the trade name Silquest® A-174, from the company Momentive), methacryloxymethyltrimethoxysilane (for example available, under the name Geniosil® XL33, from Wacker), vinyltrimethoxysilane, isooctyltrimethoxysilane or phenyltrimethoxysilane.

The moisture absorber content is preferably less than or equal to 3% by weight, more preferably less than or equal to 2% by weight relative to the total weight of the composition according to the invention. When it is present, the moisture absorber may represent, for example, from 0.1% to 3% by weight or from 1% to 2% by weight, relative to the total weight of the composition according to the invention.

Some of these moisture-absorbing compounds may also act as adhesion-promoters, particularly the trialkoxysilanes containing an amino, mercapto or epoxy group. Examples that may be given include:

N-(3-(trimethoxysilyl)propyl)ethylenediamine sold under the name Geniosil® GF9 by the company Wacker, or 3-aminopropyltrimethoxysilane sold under the name Silquest A-1110 by Momentive.

An amount of from 0.5% to 2% by weight (based on the weight of said composition) will generally be appropriate.

The composition according to the invention may also comprise a plasticizer.

As examples of plasticizers that may be used, use may be made of any plasticizer usually used in the field of adhesives, for instance phthalates, benzoates, trimethylolpropane esters, trimethylolethane esters, trimethylolmethane esters, glycerol esters, pentaerythritol esters, naphthenic mineral oils, adipates, cyclohexyldicarboxylates, liquid paraffins, natural oils (optionally epoxidized), polypropylenes, polybutylenes, hydrogenated polyisoprenes, and mixtures thereof.

Among the phthalates, examples that may be mentioned include diisononyl phthalate, diisobutyl phthalate, dioctyl phthalate, dicyclohexyl phthalate, diisooctyl phthalate, diisodecyl phthalate, dibenzyl phthalate or butylbenzyl phthalate.

Among the benzoates, examples that may be mentioned include: neopentyl glycol dibenzoate (available, for example, under the name Uniplex® 512 from Lanxess), dipropylene glycol dibenzoate (available, for example, under the name Benzoflex® 9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex® 2088 from Eastman).

Among the pentaerythritol esters, examples that may be mentioned include pentaerythrityl tetravalerate (available, for example, under the name Pevalen™ from the company Perstorp).

Among the cyclohexanedicarboxylates, an example that may be mentioned is diisononyl 1,2-cyclohexanedicarboxylate (available, for example, under the name Hexamoll Dinch® from BASF).

The total content of plasticizer(s) in the composition according to the invention may range from 0% to 30% by weight, preferably from 1% to 30% by weight or even, for example, from 1% to 15% by weight relative to the total weight of said composition.

The composition according to the invention may also comprise an antioxidant (also denoted by the term UV stabilizer).

Antioxidants are compounds that may be introduced to protect the composition from degradation resulting from a reaction with oxygen which is liable to be formed by the action of heat or light. These compounds may include primary antioxidants which trap free radicals. The primary antioxidants may be used alone or in combination with other secondary antioxidants or UV stabilizers.

Examples that may be mentioned include Irganox® 1010, Irganox® B561, Irganox® 245, Irganox® 1076 and Irgafos® 168 sold by BASF.

An amount of antioxidant ranging from 0.1% to 3%, preferably from 1% to 3% by weight, on the basis of the total weight of the composition according to the invention is generally used.

The composition according to the invention may also comprise a silsesquioxane resin. The composition then advantageously makes it possible to obtain an adhesive seal whose mechanical properties, notably in terms of elongation and breaking strength, are improved. Silsesquioxane resins are organosilicon compounds which can adopt a polyhedral structure or a polymeric structure, with Si—O—Si bonds. They generally have the following general formula:

$$[RSiO_{3/2}]_t$$

in which R, which may be identical or different in nature, represents an organic radical and t is an integer which may range from 6 to 12, t preferably being equal to 6, 8, 10 or 12.

According to one embodiment, the silsesquioxane has a polyhedral structure (or POSS for "Polyhedral Oligomeric Silsesquioxane").

Preferably, the silsesquioxane corresponds to the general formula (V) below:

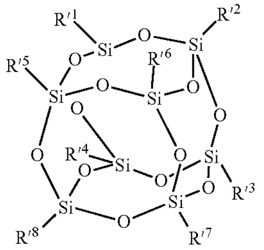

(V)

in which each one from among R'[1] to R'[8] represents, independently of each other, a group chosen from:

a hydrogen atom, a radical chosen from the group consisting of a linear or branched C1-C4 alkoxy radical, a linear or branched alkyl radical comprising from 1 to 30 carbon atoms, an alkenyl radical comprising from 2 to 30 carbon atoms, an aromatic radical comprising from 6 to 30 carbon atoms, an allyl radical comprising from 3 to 30 carbon atoms, a cyclic aliphatic radical comprising from 3 to 30 carbon atoms and an acyl radical comprising from 1 to 30 carbon atoms, and a group —OSiR'[9]R'[10] in which R'[9] and R'[10] each represent, independently of each other, a hydrogen atom or a radical chosen from the group consisting of linear or branched C1-C4 alkyls, linear or branched C1-C4 alkoxys, C2-C4 alkenyls, a phenyl, a C3-C6 allyl radical, a cyclic C3-C8 aliphatic radical and a C1-C4 acyl radical;

on condition:

that at least one radical from among the radicals R'[1] to R'[8] is a C1-C4 alkoxy radical; and that at least one radical from among the radicals R'[1] to R'[8] is a phenyl radical.

Silsesquioxanes are known compounds that are notably described in patent application WO 2008/107331. Some are also commercially available, thus the product from Dow sold under the name: Dow Corning® 3074 and Dow Corning® 3037 (CAS number=68957-04-0).

An amount of silsesquioxane resin ranging up to 15%, preferably from 3% to 10% by weight, on the basis of the total weight of the composition according to the invention may advantageously be used.

The composition according to the invention may, finally, also comprise a polyvinyl ether compound. The composition then advantageously has improved water vapour permeability, suitable for the manufacture of waterproof-breathable self-adhesive articles suitable for medical, clothing or construction applications. Such a polyvinyl ether compound may be a homopolymer or a copolymer comprising a repeating unit derived from monomers of general formula:

$$R—O—C(R^8)═CH(R^9)$$

in which:

R represents a saturated or unsaturated, linear or branched group comprising from 1 to 24 carbon atoms, preferably from 1 to 10 carbon atoms, preferably from 1 to 8 carbon atoms, and more preferably from 1 to 4 carbon atoms; and $R^8$ and $R^9$ represent, independently of each other, a hydrogen atom or an alkyl group comprising from 1 to 10 carbon atoms.

Among the polyvinyl ether homopolymers, mention may notably be made of poly(methyl vinyl ether), poly(ethyl vinyl ether), poly(butyl vinyl ether), poly(isobutyl vinyl ether), poly(isopropyl vinyl ether), poly(propyl vinyl ether), poly(octyl vinyl ether).

Commercial polyvinyl ether compounds may include Lutonal® M 40, Lutonal® A 25, Lutonal® A 50, Lutonal® A 100, Lutonal® I 30, Lutonal® I 60, Lutonal® I 60 D and Lutonal® I 65 D available from the company BASF and Gantrez® M available from the company GAF.

An amount of polyvinyl ether compound ranging from 1% to 60%, preferably from 5% to 40% by weight, on the basis of the total weight of the composition according to the invention may be suitable for use.

The adhesive composition according to the invention may be in the form of a one-component adhesive composition or a multicomponent, preferably two-component, adhesive composition.

I. One-Component Adhesive Composition:

According to a first embodiment, the adhesive composition according to the invention is in the form of a one-component composition.

According to this embodiment, said one-component composition generally comprises:

from 10% to 90% by weight, preferably from 15% to 80% by weight and more preferentially from 20% to 60% by weight, of the polymer(s) (A) comprising at least one hydrolysable alkoxysilane group;

from 3% to 50% by weight, preferably from 6% to 35% by weight, of the silylated tackifying resin(s) (B);

from 15% to 80% by weight, preferably from 20% to 70% by weight and more preferentially from 30% to 60% by weight of the non-silylated tackifying resin(s) (C); and from 0.01% to 10%, preferably from 0.01% to 5%, preferentially from 0.05% to 4%, advantageously from 0.1% to 3%, in particular from 0.1% to 0.5% by weight of crosslinking catalyst (D);

these weight percentages being indicated on the basis of the total weight of one-component composition.

The one-component composition may be prepared via a process which comprises:

a step of mixing, with the exclusion of air, preferably under an inert atmosphere, the polymer(s) (A) with the silylated tackifying resin(s) (B), and the non-silylated tackifying resin(s) (C), where appropriate the silsesquioxane resin, when it is present, at a temperature of between 50° C. and 180° C., preferably between 100° C. and 165° C., and then a step of cooling said mixture to a temperature ranging from 50° C. to 130° C., and advantageously ranging from 70° C. to 100° C., and then a step of incorporating, into said mixture, the crosslinking catalyst (D) and, where appropriate, the other optional additives.

II. Multicomponent Adhesive Composition:

According to a second embodiment, the adhesive composition according to the invention is in the form of a multicomponent composition comprising:

a composition U (as first component) comprising:

the polymer(s) (A) comprising at least one hydrolysable alkoxysilane group, as defined previously; and the silylated tackifying resin(s) (B) as defined previously;

the non-silylated tackifying resin(s) (C) as defined previously; and a composition V (as second component) comprising:

the crosslinking catalyst(s) (D) as defined previously; and optionally at least one compound (E) chosen from:

a compound (E1) with a number-average molecular mass ranging from 300 g/mol to 100000 g/mol; and a compound (E2) with a vapour pressure at 20° C. of greater than or equal to 0.08 kPa;

and also mixtures thereof.

The various components of said multicomponent adhesive composition are intended to be mixed at the time of performing the crosslinking reaction, in accordance with the process for manufacturing a self-adhesive support described below.

The multicomponent adhesive composition may comprise one or more additional compositions in addition to compositions U and V, said additional composition(s) possibly comprising compound(s) of any type. For example, the multicomponent adhesive composition may comprise an additional composition W comprising at least one silylated (B) and/or non-silylated (C) tackifying resin, for example chosen from those described above. The multicomponent adhesive composition according to the invention may also comprise a composition W comprising water. The water may be in liquid or gaseous form, or encapsulated, or absorbed, or contained in the chemical structure of a component. The water may be derived from one or more components which may subsequently render it free and available.

The multicomponent adhesive composition according to the invention advantageously leads to high crosslinking rates for the process for manufacturing the self-adhesive support described below. The improved reactivity advantageously make it possible to avoid treatment in an oven, or to reduce the residence time in the crosslinking oven during the preparation of self-adhesive supports, and thus to reach a short residence time in the oven, namely, for example, less than 5 minutes, preferably less than 1 minute, preferentially less than 30 seconds, and advantageously less than 10 seconds. The multicomponent adhesive composition according to the invention thus advantageously leads to high industrial production rates, while at the same time having good self-adhesive properties after crosslinking.

Compositions U and V included in said adhesive composition (before mixing) are stable on storage, with respect to temperature and/or to moisture. The greater stability over time advantageously allows longer storage and handling with a reduced risk of reaction, degradation or crosslinking of compositions U and V, between their production and their hot application.

The multicomponent adhesive composition according to the invention advantageously allows the formation of a uniform adhesive layer which does not have any problem of uncontrolled and non-homogeneous formation of grains or gels, and/or advantageously allows uniform crosslinking over the entire support layer.

The multicomponent adhesive composition may advantageously comprise a high content of catalyst, without giving rise to setting to a solid in the tubes in which the components of the adhesive circulate during the production of self-adhesive articles.

According to an even more preferred embodiment, the multicomponent adhesive composition according to the invention is a two-component adhesive composition consisting of the abovementioned compositions U and V.

II.1. Composition U:

Composition U generally comprises:

from 10% to 90% by weight, preferably from 15% to 80% by weight and more preferentially from 20% to 60% by weight, of polymer(s) (A) comprising at least one hydrolysable alkoxysilane group;

from 3% to 45% by weight, preferably from 3% to 30% and more preferentially from 6% to 30%, for example from 6% to 20% by weight of the silylated tackifying resin(s) (B);

from 15% to 80% by weight, preferably from 20% to 70% by weight and more preferentially from 30% to 60% by weight of the non-silylated tackifying resin(s) (C);

these weight percentages being indicated on the basis of the total weight of composition U.

In addition, composition U may also comprise one or more additives, as described previously, chosen from the group consisting of moisture absorbers, plasticizers, antioxidants, pigments, colorants, adhesion promoters, UV stabilizers, fillers, silsesquioxane resins and polyvinyl ether compounds as described previously.

According to one embodiment, composition U comprises:

from 10% to 90% by weight, preferably from 15% to 80% by weight and more preferentially from 20% to 60% by weight, of polymer(s) (A) comprising at least one hydrolysable alkoxysilane group;

from 3% to 30% by weight, preferably from 6% to 20% by weight, of silylated tackifying resin(s) (B);

from 15% to 80% by weight, preferably from 20% to 70% by weight and more preferentially from 30% to 60% by weight of the non-silylated tackifying resin(s) (C);

these weight percentages being indicated on the basis of the total weight of composition U.

Composition U according to this embodiment may also comprise one or more additives, as described previously for the general composition U.

Composition U may be prepared by mixing all of the components of said composition U, irrespective of the order of incorporation of the various components. Several components of composition U may be mixed together, and then subsequently mixed with other component(s) of said composition U.

The mixing may be performed at a temperature ranging from 23° C. to 200° C.

II.2. Composition V:

Composition V comprises:

the crosslinking catalyst(s) (D) as defined previously; and optionally at least one compound (E) chosen from:

a compound (E1) with a number-average molecular mass ranging from 300 g/mol to 500000 g/mol;

a compound (E2) with a vapour pressure at 20° C. greater than or equal to 0.08 kPa; and mixtures of (E1) and (E2).

According to one embodiment, composition V comprises:

a compound (E1);

a mixture of different compounds (E1);

a compound (E2);

a mixture of different compounds (E2); or a mixture of at least one compound (E1) and of at least one compound (E2).

II.2.1. Compound (E):

The presence of the compound(s) (E) allows dilution of the crosslinking catalyst (D) in composition V, and thus advantageously allows an increase in the flash point of said composition V. This notably has the effect of advantageously improving the safety of the process for preparing a self-adhesive article.

In addition, the presence of the compound(s) (E), in particular in contents of greater than or equal to 50% by weight of composition V, advantageously makes it possible to reduce the risks of toxicity, during the use, for example, of an organometallic catalyst.

Moreover, the presence of the compound(s) (E) in composition V advantageously allows better dispersion of the catalyst(s) (D) in the two-component adhesive composition (obtained after mixing compositions U and V). This better dispersion advantageously leads to coating with a uniform adhesive layer which does not present any problem of formation of grains and/or gels that impair the optical quality of the final coatings, or which hinder the defect-free application of the coating onto the surfaces to be bonded.

Furthermore, the presence of the compound(s) (E) in composition V advantageously makes it possible to add very small amounts of catalyst (D).

The compound(s) (E) are advantageously inert with respect to the crosslinking catalyst (D), i.e. they do not react with said catalyst.

II.2.1.1 Compound (E1):

Compound (E1) preferably has a number-average molecular mass ranging from 1000 g/mol to 50000 g/mol, preferably from 1000 g/mol to 20000 g/mol, in particular from 2000 g/mol to 20000 g/mol, preferentially from 3000 g/mol to 20000 g/mol, for example from 4000 g/mol to 18000 g/mol, advantageously from 5000 g/mol to 10000 g/mol, and notably from 7000 g/mol to 9000 g/mol.

The number-average molecular mass of compound (E1) may be measured by methods that are well known to those skilled in the art, for example by size exclusion chromatography using polystyrene standards.

Compound (E1) preferably has a viscosity at 23° C. ranging from 10 mPa·s to 100000 mPa·s, in particular from 500 to 50000 mPa·s, preferably from 500 to 20000 mPa·s, preferentially from 500 to 15000 mPa·s, advantageously from 500 to 10000 mPa·s, for example from 1000 to 5000 mPa·s, preferably from 1000 to 3000 mPa·s.

According to the invention, compound (E1) may be chosen from the group consisting of:

(E1-1) polyols;

(E1-2) organosilanes;

(E1-3) tackifying resins;

(E1-4) polyol esters;

(E1-5) monosilylated or disilylated polymers;

(E1-6) polyetheramines;

(E1-7) silsesquioxane resins;

(E1-8) polyvinyl ether compounds;

and also mixtures thereof.

According to the invention, compound (E1) may be a reactive or unreactive compound, also denoted by the term reactive or unreactive diluent. The term "reactive" means that it comprises at least one function which can react with the alkoxysilane function(s) of the silylated polymer of composition U, during the mixing of compositions U and V. For example, the polyols, the tackifying resins and the polyol esters are unreactive compounds. For example, the organosilanes and the monosilylated or disilylated polymers are reactive compounds.

The use of reactive compound (E1) in composition V advantageously makes it possible to better modulate the performance of the adhesive composition obtained after mixing compositions U and V.

Polyols (E1-1):

According to one embodiment, compound (E1) is a polyol chosen from the group consisting of polyether polyols, polyester polyols, polytetrahydrofuran polyols, polyacrylate polyols, polycarbonate polyols, polyether carbonate polyols, polyester carbonate polyols, polyacetal polyols, poly(ester-amide) polyols, polythio ether polyols, polyolefin polyols, and mixtures thereof, compound (E1) preferably being chosen from polyether polyols, polyester polyols and mixtures thereof.

In the context of the invention, the term "polyol" means any linear or branched, cyclic or acyclic, saturated or unsaturated, aromatic or aliphatic, hydrocarbon-based compound comprising at least two hydroxyl (OH) functions. The polyol may be optionally substituted with a functional group, and/or may comprise one or more divalent groups chosen from ether (—O—), and carboxyl (—C(═O)O— or —OC(═O)—) groups.

The polyols may be chosen from diols, triols, and mixtures thereof.

According to one embodiment, compound (E1) is a polyol chosen from the group consisting of polyols with an $I_{OH}$ ranging from 5 to 500 mg KOH/g, preferably from 5 to 250 mg KOH/g, preferentially from 6 to 50 mg KOH/g, in particular from 10 to 28 mg KOH/g.

The hydroxyl number $I_{OH}$ of a polyol represents the number of hydroxyl functions per gram of polyol, and is expressed in the form of the equivalent number of milligrams of potassium hydroxide (KOH) used in the assay of the hydroxyl functions, determined experimentally by titrimetry according to the standard ISO 14900:2001. In the case of a mixture of polyols, the $I_{OH}$ may also be calculated from the known $I_{OH}$ values of each of the polyols and from their respective weight contents in said mixture.

The polyacetal polyols may be, for example, those prepared by reaction between a glycol (for instance diethylene glycol) with formaldehyde. Polyacetals may also be prepared by polymerization of cyclic acetals.

The polyolefin polyols may be butadiene homopolymers and copolymers comprising hydroxyl end groups.

The polycarbonate polyols may be those obtained by reaction between at least one diol comprising from 2 to 10 carbon atoms (for instance 1,3-propanediol, 1,4-butanediol, 1,6-hexanediol, diethylene glycol or tetraethylene glycol) with at least one diaryl carbonate comprising from 3 to 20 carbon atoms, for instance diphenyl carbonate, or with phosgene.

The polyester polyols may be:

- polyester polyols of natural origin, such as castor oil;
- polyester diols derived from a polymerization with ring opening of at least one lactone ring (preferably comprising from 3 to 7 carbon atoms) with at least one diol, such as polycaprolactone polyols;
- polyester polyols resulting from condensation between:
  - at least one dicarboxylic acid or at least one of the corresponding anhydrides or diesters thereof; and
  - at least one diol.

The dicarboxylic acid(s) that may be used for the synthesis of the abovementioned polyester polyols preferably comprise from 3 to 40 carbon atoms, and preferentially from 6 to 10 carbon atoms.

Preferably, the dicarboxylic acid(s) that may be used for the synthesis of the abovementioned polyester polyols are chosen from the group consisting of malonic acid, succinic acid, fumaric acid, glutaric acid, adipic acid, 1,3- or 1,4-cyclohexanedicarboxylic acid, 3-methyl-1,5-pentanedicarboxylic acid, 1,10-decanedicarboxylic acid, 1,12-dodecanedicarboxylic acid, 1,18-octadecanedicarboxylic acid, methyltetrahydrophthalic acid, hexahydrophthalic acid, tetrahydrophthalic acid, azelaic acid, sebacic acid, and mixtures thereof.

The diol(s) that may be used for the synthesis of the abovementioned polyester polyols may be chosen from polyalkylene diols, polyoxyalkylene diols, and mixtures thereof, the alkylene (saturated) part of these compounds preferably being linear or branched and preferably comprises from 2 to 40 carbon atoms and preferentially from 2 to 8 carbon atoms.

Preferably, the diol(s) that may be used for the synthesis of the abovementioned polyester polyols are chosen from the group consisting of ethylene glycol, diethylene glycol, triethylene glycol, neopentyl glycol, 1,6-hexanediol, butanediol, propylene glycol, dipropylene glycol, tetraethylene glycol, tripropylene glycol, 3-methyl-1,5-pentanediol, 2,2-dimethyl-1,3-propanediol, and mixtures thereof.

Among the polyester polyols, examples that may be mentioned include the following products with a hydroxyl functionality equal to 2:

- Tone® 0240 (available from Union Carbide), which is a caprolactone with a number-average molecular mass of about 2000 Da, an $I_{OH}$ equal to 56, and with a melting point of about 50° C.;
- Dynacoll® 7381 (available from Evonik), the number-average molecular mass of which is about 3500 Da, of $I_{OH}$ equal to 30, and with a melting point of about 65° C.;
- Dynacoll® 7360 (available from Evonik) resulting from the condensation of adipic acid with hexanediol, the number-average molecular mass of which is about 3500 Da, of $I_{OH}$ equal to 30, and with a melting point of about 55° C.;
- Dynacoll® 7330 (available from Evonik), the number-average molecular mass of which is about 3500 Da, of $I_{OH}$ equal to 30, and with a melting point of about 85° C.;
- Dynacoll® 7363 (available from Evonik) resulting from the condensation of adipic acid with hexanediol, the number-average molecular mass of which is about 5500 Da, of $I_{OH}$ equal to 21, and with a melting point of about 57° C.

In the context of the invention, the term "hydroxyl functionality of a polyester polyol" means the mean number of hydroxyl functions per mole of polyester polyol.

The polyester polyols may be amorphous or crystalline, preferably amorphous.

Preferably, the polyester polyols are those obtained by condensation reaction between adipic acid and a mixture of neopentyl glycol, ethylene glycol and 1,6-hexanediol; or between adipic acid and 3-methyl-1,5-pentanediol.

The polyether polyols may be oxyalkyl derivatives of diols (for instance ethylene glycol, propylene glycol, neopentyl glycol), of triols (for instance glycerol, trimethylolpropane, hexane-1,2,6-triol), or of tetraols (for instance pentaerythritol). The polyether polyols may be obtained by polymerization of the corresponding alkylene oxide in the presence of a catalyst.

Preferably, the polyether polyols are polypropylene glycols (or PPG), in particular having a hydroxyl functionality equal to 2 or 3, and preferably a polydispersity index ranging from 1 to 1.6, preferably from 1 to 1.4.

In the context of the invention, the term "polydispersity index" means the ratio between the weight-average molecular mass and the number-average molecular mass, determined notably by GPC.

Among the polypropylene glycols with a hydroxyl functionality equal to 2, mention may be made of:

- Voranol® EP 1900: difunctional PPG with a number-average molecular mass of about 4008 g/mol, and a hydroxyl number $I_{OH}$ equal to 28 mg KOH/g;
- Acclaim® 8200: difunctional PPG with a number-average molecular mass of 8016 g/mol, and a hydroxyl number $I_{OH}$ equal to 14 mg KOH/g;
- Acclaim® 12200: difunctional PPG with a number-average molecular mass of 11 222 g/mol, and a hydroxyl number $I_{OH}$ equal to 10 mg KOH/g;
- Acclaim® 18200: difunctional PPG with a number-average molecular mass of 17 265 g/mol, and a hydroxyl number $I_{OH}$ equal to 6.5 mg KOH/g.

Among the polypropylene glycols with a hydroxyl functionality equal to 3, mention may be made of:

- Voranol® CP 755: trifunctional PPG with a number-average molecular mass of about 710 g/mol, and a hydroxyl number $I_{OH}$ equal to 237 mg KOH/g;
- Voranol® CP 3355: trifunctional PPG with a number-average molecular mass of about 3544 g/mol, and a hydroxyl number $I_{OH}$ equal to 47.5 mg KOH/g;
- Acclaim® 6300: trifunctional PPG with a number-average molecular mass of about 5948 g/mol, and a hydroxyl number $I_{OH}$ equal to 28.3 mg KOH/g.

In the context of the invention, the term "hydroxyl functionality of a polyether polyol" means the mean number of hydroxyl functions per mole of polyether polyol.

According to a preferred embodiment, the polyether polyols have a functionality equal to 2 and a number-average molecular mass preferably ranging from 3000 to 20000 g/mol, preferentially from 4000 to 19000 g/mol, in particular from 5000 to 15000 g/mol, and advantageously from 7000 to 13000 g/mol.

According to a preferred embodiment, the polyether polyols have a functionality equal to 3 and a number-average molecular mass preferably ranging from 500 to 20000 g/mol, preferentially from 500 to 10000 g/mol, in particular from 500 to 5000 g/mol, and advantageously from 500 to 4000 g/mol.

Organosilanes (E1-2):

According to one embodiment, compound (E1) is chosen from organosilanes, in particular chosen from the group consisting of aminosilanes, mercaptosilanes, glycidoxysilanes, vinylsilanes, epoxy silanes, (meth)acrylate silanes, glycoxysilanes, anhydro silanes, and mixtures thereof.

In the context of the invention, the term "organosilane" means a compound comprising an organic group bonded to the Si atom by means of an Si—C bond.

Preferably, the organosilanes comprise at least one, preferably at least two or even three, alkoxy groups connected to the Si atom by means of Si—O bonds.

The organosilanes may be monomers or oligomers.

Among the organosilanes, examples that may be mentioned include 3-aminopropylmethyldimethoxysilane, 3-aminopropyltrimethoxysilane (for example available under the name Silquest® A1110 from the company Momentive), 3-glycidoxypropyltrimethoxysilane (for example available under the name Silquest® A-187 from the company Momentive), 3-mercaptopropyltrimethoxysilane (for example available under the name Silquest® A-189 from the company Momentive), mercaptopropyltriethoxysilane, mercaptopropylmethyldimethoxysilane, mercaptopropylmethyldiethoxysilane, mercaptomethyltrimethoxysilane, mercaptomethyltriethoxysilane, N-aminoethyl-3-aminopropyltrimethoxysilane, 3-methacryloxypropyltrimethoxysilane (for example available under the name Silquest®

A-174NT from the company Momentive), tris(3-trimethoxysilylpropyl) isocyanurate (for example available under the name Silquest® Y-11597 from the company Momentive), bis(3-triethoxysilylpropyl) polysulfide (for example available under the name Silquest® A-1289 from the company Momentive), bis(3-triethoxysilyl) disulfide (for example available under the name Silquest® A-1589 from the company Momentive), β-(3,4-epoxycyclohexyl)ethyltrimethoxysilane (for example available under the name Silquest® A-186 from the company Momentive), bis(triethoxysilyl) ethane (for example available under the name Silquest® Y-9805 from the company Momentive), gamma-isocyanatopropyltrimethoxysilane (for example available under the name Silquest® A-Link 35 from the company Momentive), (methacryloxymethyl)tri(m)ethoxysilane (for example available under the names Geniosil® XL 33, or Geniosil® XL 36 from the company Wacker), (methacryloxymethyl)(m)ethyldimethoxysilane (for example available under the names Geniosil® XL 32, or Geniosil® XL34 from the company Wacker), (isocyanatomethyl)methyldimethoxysilane (for example available under the name Geniosil® XL 42 from the company Wacker), (isocyanatomethyl)trimethoxysilane (for example available under the name Geniosil® XL 43 from the company Wacker), (methacryloxymethyl)methyldiethoxysilane, 2-acryloxyethylmethyldimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropoxysilane, 3-methacryloxypropyltriethoxysilane, 3-methacryloxypropyltriacetoxysilane, 3-methacryloxypropylmethyldimethoxysilane, glycoxysilane derived from the reaction between 2-methyl-1,3-propanediol and vinyltrimethoxysilane, and mixtures thereof.

Tackifying Resins (E1-3):

According to one embodiment, compound (E1) is chosen from tackifying resins in particular having a number-average molecular mass ranging from 100 g/mol to 6000 g/mol, preferably from 300 g/mol to 4000 g/mol.

The tackifying resin may be, for example, any silylated (B) or non-silylated (C) tackifying resin as defined previously.

Polyol Esters (E1-4):

According to one embodiment, compound (E1) is chosen from polyol esters. The polyol esters may be prepared, for example, by esterification reaction of polyol, for example of tetrol, for instance of pentaerythritol.

An example of a polyol ester that may be mentioned is pentaerythritol tetravalerate.

Monosilylated or Disilylated Polymers (E1-5):

According to one embodiment, compound (E1) is chosen from monosilylated polymers, disilylated polymers and mixtures thereof.

The disilylated polymers may be any of those mentioned previously for the definition of the silylated polymer (A), in particular the polymers of the abovementioned formulae (II'), (III') or (IV').

Preferably, the monosilylated polymers comprise a group of the abovementioned formula (I).

Polyetheramines (E1-6):

In the context of the invention, and unless otherwise mentioned, the term "polyetheramines" means compounds comprising a polyether main chain, and at least one amine function (or even at least two amine functions).

According to one embodiment, compound (E1) is chosen from polyetheramines.

Among the polyetheramines, mention may be made in particular of the Jeffamine products sold by the company Huntsman, for instance the polyetherdiamine of formula: $H_2N—CH_2—CH_2—O—CH_2—CH_2—O—CH_2—CH_2—NH_2$ having a primary alkalinity of 13.49 meq/g (available, for example, under the trade name Jeffamine® ED 148 from the company Huntsman).

Silsesquioxane Resins (E1-7):

According to one embodiment, compound (E1) is chosen from the silsesquioxane resins as described previously.

Polyvinyl Ether Compounds (E1-8):

According to yet another embodiment, compound (E1) is chosen from the polyvinyl ether resins as described previously.

II.2.1.2 Compound (E2):

Compound (E) included in composition V may also be a compound (E2) (denoted by the term "unreactive diluent") having a vapour pressure at 20° C. greater than or equal to 0.08 kPa.

Compound (E2) preferably has a vapour pressure at 20° C. of between 0.08 kPa and 13 kPa, preferentially between 0.08 kPa and 8 kPa, even more preferentially between 0.1 kPa and 5 kPa.

Compound (E2) is chosen from alcohols, for example from isopropanol, isobutanol, butanol, methanol, 2-butoxyethanol, and mixtures thereof.

Advantageously, compound (E2) is evaporated during the application of the adhesive composition to a support layer.

According to a preferred embodiment, when the crosslinking catalyst included in composition V is an acid derivative as described above, compound (E) is a compound (E1).

According to a preferred embodiment, when the crosslinking catalyst is not an acid derivative as described above, compound (E) is a compound (E1) or (E2).

Preferably, when the catalyst is an inorganic acid, for instance orthophosphoric acid, compound (E) is not chosen from polyols.

II.2.2. Weight Content of the Ingredients of Composition V:

Composition V generally comprises:

- from 0.01% to 100% by weight of the crosslinking catalyst(s) (D), preferably from 1% to 90%, preferentially from 5% to 90%, more preferentially from 10% to 80%, even more preferentially from 10% to 70%, advantageously from 20% to 60%, in particular from 20% to 50%; and
- from 0% to 99.99% by weight of the compound(s) (E), preferably from 10% to 99%, for example from 10% to 95%, preferentially from 20% to 90%, even more preferentially from 30% to 80%, advantageously from 40% to 70%;

these weight percentages being indicated on the basis of the total weight of the composition V.

In the context of the invention, and unless otherwise mentioned, the mass content of catalyst is the solids content (referred to as active material).

II.2.3. Optional Additives Included in Composition V:

Composition V may comprise water. The water may originate from the compounds of composition V, and/or may be added to composition V.

The water content in composition V may range from 0.05% to 50% by mass, preferably from 0.1% to 30% by mass, preferentially from 0.5% to 15% by mass, advantageously from 0.5% to 10% by mass, in particular from 0.5% to 5% by mass relative to the total mass of composition V.

According to one embodiment, composition V comprises water, in particular when compound (E) comprises at least one compound (E1) which is not an organosilane or a monosilylated or disilylated polymer.

According to one embodiment, composition V comprises water, in particular when compound (E) is a compound (E2).

According to one embodiment, composition V is free of water. The term "free of water" means a water content of less than or equal to 200 ppm, preferably less than or equal to 100 ppm, for example less than or equal to 50 ppm, or even less than or equal to 20 ppm. Preferably, composition V is free of water, when compound (E) comprises at least one compound (E1) chosen from organosilanes, monosilylated or disilylated polymers, and mixtures thereof.

The water content may be measured, for example by Karl Fischer assay according to the standard ISO 760.

The water contained in composition V may be in liquid or gaseous form, or encapsulated, or absorbed, or contained in the chemical structure of a component which can subsequently render it free and available.

The water may be derived from one or more components of said composition V.

Composition V may comprise at least one additive chosen from the group mentioned previously and consisting of moisture absorbers, plasticizers, antioxidants, pigments, colorants, adhesion promoters, UV stabilizers and fillers.

Composition V may contain a compound chosen from $NH_4F$, $Bu_4NF$, HF, $BF_3$, $Et_2NSF_3$, $HSO_3F$, a polymer of the type such as polyether polyol PPG comprising at least one fluoro group, a compound bearing at least one Si—F bond, and mixtures thereof.

Composition V may be prepared by mixing all of the components of said composition, irrespective of the order of incorporation of the various components. Several components of composition V may be mixed together, and then subsequently mixed with other component(s) of said composition V.

The mixing may be performed at a temperature ranging from 23° C. to 200° C.

II.2.4. Properties of Composition V:

According to one embodiment, composition V has a viscosity at 23° C. which ranges from 3 mPa·s to 50000 mPa·s, preferably from 600 mPa·s to 25000 mPa·s, preferentially from 800 mPa·s to 16000 mPa·s, advantageously from 1000 mPa·s to 5000 mPa·s, for example from 1100 mPa·s to 2000 mPa·s, in particular from 1200 mPa·s to 1500 mPa·s.

According to one embodiment, composition V has a viscosity at a temperature ranging from 40° C. to 160° C., preferably from 60° C. to 100° C., which ranges from 50 mPa·s to 500000 mPa·s, preferably from 600 mPa·s to 100000 mPa·s, preferentially from 1200 mPa·s to 50000 mPa·s, advantageously from 1200 mPa·s to 10000 mPa·s, for example from 1200 mPa·s to 5000 mPa·s.

The constituents of composition V are preferably chosen such that composition V is advantageously stable over time. Preferably, composition V is such that the ratio $$(V_{final}-V_{initial})/V_{initial}$$

is less than or equal to 30%, preferably less than or equal to 20%, preferentially less than or equal to 10%, with:

$V_{final}$ being the viscosity of composition V after heating at 40° C. for 28 days, measured at 23° C.;

$V_{initial}$ being the viscosity of composition V before said heating, measured at 23° C.

The crosslinking catalyst (D) is advantageously chosen so as to be soluble in the abovementioned compound(s) (E) (and, where appropriate, the silsesquioxane resin), advantageously to form a composition V which is homogeneous, notably on storage at 23° C. or after heating at 40° C. for 28 days. The term "homogeneous" means that there is no phase separation (flocculation or sedimentation) between the catalyst(s) and the compound(s) C in composition V.

II.3. Other Features of the Multicomponent Adhesive Composition:

According to a preferred variant of said multicomponent adhesive composition, the weight of composition V divided by the total weight of said multicomponent, preferably two-component, adhesive composition ranges from 0.02% to 40%, preferably from 0.05% to 40%, preferentially from 0.05% to 20%, more preferentially from 0.05% to 15%.

The catalyst included in the multicomponent adhesive composition is the crosslinking catalyst (D) included in composition V.

The total content of crosslinking catalyst (D) in the multicomponent, and preferably two-component, adhesive composition according to the invention may range from 0.01% to 10%, preferably from 0.01% to 5%, preferentially from 0.05% to 4%, advantageously from 0.1% to 3%, in particular from 0.5% to 2% by weight, relative to the total weight of said two-component adhesive composition.

According to one embodiment, when the crosslinking catalyst (D) is chosen from acids and derivatives thereof, its total content in the multicomponent, preferably two-component, adhesive composition is less than or equal to 1%, preferably less than or equal to 0.5%, advantageously less than or equal to 0.2%, preferentially less than or equal to 0.1%, or even less than or equal to 0.05%, relative to the total weight of said composition.

Preferably, the adhesive composition according to the invention is packaged in a kit comprising at least two separate compartments, namely a first compartment for composition U and a second compartment for composition V, and optionally other compartments for additional compositions.

Kit:

The present invention also relates to a kit comprising at least the abovementioned composition U and composition V in two separate compartments. The compartments may be, for example, drums, cartridges or bags. When the multicomponent adhesive composition comprises other compositions, they are contained in other compartments of the kit.

Self-Adhesive Article:

A subject of the present invention is also a self-adhesive article comprising a support layer coated with a self-adhesive layer, characterized in that said self-adhesive layer consists of the adhesive composition according to the invention in crosslinked form.

For the purposes of the present invention, the term "self-adhesive article" includes any article that can be adhesively bonded to a surface solely by the action of pressure with the hand or an item of equipment, without the use of additional glues or adhesives.

The self-adhesive article is a pressure-sensitive self-adhesive article.

The support layer coated with a self-adhesive layer is also denoted by the term "self-adhesive support".

These articles notably have the aim of being applied to a surface to be bonded so as to bring together, maintain, fix, or simply immobilize, expose forms, logos, images or information. These articles may be used in many fields, such as the medical field, clothing, packaging, motor vehicles (for example for attaching logos, lettering, interior soundproofing, interior trim, bonding in the passenger compartment) or construction (for example for sound and thermal insulation, the assembling of windows). They may be fashioned as a function of their final application, for example in the form of tapes, such as tapes for industrial use, tapes for do-it-yourself work or for fixing use on worksites, single-sided or double-sided tapes, or in the form of labels, bandages, dressings, patches or graphic films.

According to one embodiment, the self-adhesive article is a self-adhesive multilayer system, and in particular a self-adhesive label or tape, which may be single-sided or double-sided.

The material that may be used for the support layer may be, for example, any type of rigid or flexible support. Examples that may be mentioned include supports of the type such as foams, felts, nonwoven supports, plastics, membranes, papers or a film of a polymer material with one or more layers, notably a non-stick protective paper or plastic film.

The support layer is made of a material chosen, for example, from polyolefins, such as polyethylene, including high-density polyethylene, low-density polyethylene, linear low-density polyethylene and linear ultra-low-density polyethylene; polypropylene and polybutylenes; polystyrene; natural or synthetic rubber; vinyl copolymers, such as polyvinyl chloride, which may or may not be plasticized, and poly(vinyl acetate); olefinic copolymers, such as ethylene/methacrylate copolymers, ethylene/vinyl acetate copolymers, acrylonitrile/butadiene/styrene copolymers, and ethylene/propylene copolymers; acrylic polymers and copolymers; polyurethanes; polyethers; polyesters; and mixtures thereof. The support layer is preferably, based on acrylic polymers, polyethylene (PE), polypropylene (PP), which may be oriented, non-oriented or bioriented, polyimide, polyurethane, polyester such as polyethylene terephthalate (PET), or paper.

According to one embodiment, the self-adhesive article obtained from the adhesive composition according to the invention comprises a permanent support layer coated with an adhesive layer. Preferably, the adhesive layer is also coated with a non-stick protective paper or plastic film, which is preferably silicone-treated.

According to another embodiment, the self-adhesive article obtained from the adhesive composition according to the invention comprises a non-permanent support layer which consists of a first non-stick protective paper or plastic film, which is preferably silicone-treated, said layer being coated with an adhesive layer, which itself may also be coated with a second non-stick protective paper or plastic film. This embodiment is particularly suitable for the assembly of windows by bonding, more particularly for the assembly of the rigid panel consisting of the double or triple glazing with the window frame. According to this embodiment, said non-permanent support layer is intended to be removed by the user at the moment of applying the self-adhesive article for the purpose of assembling the window.

As an alternative to the non-stick protective film, the rear face of the permanent support layer, which is not coated with the adhesive layer, may have a non-stick surface, for example a silicone-treated protective layer.

According to another embodiment, the permanent support layer is coated on both faces with an adhesive composition, which may be identical or different, at least one of the two adhesive compositions being according to the invention, advantageously leading to the manufacture of "double-sided" tapes.

Preferably, the support layer has a thickness ranging from 10 microns to 50 mm, more preferably ranging from 10 microns to 20 mm, preferably ranging from 20 microns to 10 mm, more preferably ranging from 20 microns to 1 mm.

In certain specific cases, it is necessary to perform a surface treatment on the support layer to increase the attachment of the adhesive layer during the step of coating thereon.

The self-adhesive article according to the invention can thus bond two substrates. The substrate onto which the self-adhesive article is intended to be applied (referred to as the "substrate to be bonded") may be flexible or rigid. In particular, it may have the same flexibility properties as the support layer described above, so as to be rolled up and packaged in the form of a reel, for example as described previously.

Alternatively, the substrate to be bonded may be rigid. In this case, the substrate cannot be rolled up and packaged in the form of a reel, for example as described previously. The substrate to be bonded may be chosen, for example, from concrete, paper, substrates of polyolefin type, glass, ceramic and metals, notably aluminium.

The self-adhesive layer, which consists of the adhesive composition according to the invention in the crosslinked state, and which covers the support layer, in the self-adhesive article according to the invention may have a very variable thickness, ranging from 10 μm to 5000 μm, preferably.

A thickness ranging from 10 μm to 100 μm and preferably from 20 to 50 μm is more particularly preferred in the case of self-adhesive labels, whereas a thickness ranging in a much broader interval of from 3 to 5000 μm may be encountered for self-adhesive tapes.

According to one embodiment, the self-adhesive article also comprises a protective non-stick layer (release liner).

According to one embodiment, said non-stick layer is applied to the adhesive layer, after crosslinking of the adhesive composition.

The support layer may be covered on one of its two faces, the rear face which is not coated with the adhesive layer, with a protective non-stick layer, for example with a silicone film. In this way, the self-adhesive article can be wound up on itself and then unwound without any problem by virtue of the absence of adhesion of the adhesive layer to the silicone-treated face.

Method for Manufacturing the Self-Adhesive Article:

A subject of the present invention is also a process for manufacturing the self-adhesive article as defined previously, said process being characterized in that it comprises:

(a) preheating to a temperature of between 40° C. and 130° C. of the heat-crosslinkable adhesive composition, as defined previously;
(b) applying said composition by coating onto a bearing surface;
(c) crosslinking of said composition, by heating to a temperature ranging from 50° C. to 200° C.; and then
(d) laminating or transferring the layer of crosslinked adhesive composition onto a support layer or onto a non-stick protective film.

When the heat-crosslinkable adhesive composition is, in accordance with the first embodiment described in point I, a one-component composition, it is said one-component composition which is, in accordance with step (a), preheated and then, in accordance with step (b), applied to the bearing surface and, finally, in accordance with step (c), crosslinked.

When the heat-crosslinkable adhesive composition is, in accordance with the second embodiment described in point II, a multicomponent composition and preferably a two-component composition, the preheating in accordance with step (a) relates to each of the components of said composition.

Preferably, the preheating relates to each of the two compositions U and V of the two-component composition.

The preheating step (a) is then followed by a step (a') of mixing compositions U and V at a temperature ranging from 40° C. to 130° C., the composition resulting from the mixture formed then being applied, in accordance with step (b), to the bearing surface, and then crosslinked in accordance with step (c).

For the purposes of the present invention, the term "bearing surface" should be understood as meaning either a belt conveyor coated with a non-stick layer, or a non-stick protective film ("release liner"), or a support layer.

In the case where the bearing surface is a non-stick protective film, the process for manufacturing the self-adhesive article according to the invention may comprise step (d) of transferring the crosslinked adhesive layer onto a support layer.

In the case where the bearing surface is a support layer or a non-stick protective film, the process for manufacturing the self-adhesive article according to the invention may also comprise step (d) of laminating the adhesive layer onto a non-stick protective film.

According to a preferred variant of the invention, step (d) of the process described above consists in transferring the crosslinked adhesive layer onto a flexible support layer (which may be a plastic film) after cooling of the crosslinked adhesive layer to a temperature below the degradation temperature or softening point of the material of which the support layer is composed.

According to one embodiment, the process for manufacturing the self-adhesive article according to the invention also comprises a step (e) of coating a second layer of adhesive composition according to the invention onto the support layer followed by a step (f) of crosslinking the adhesive composition coated in step (e) by heating to a temperature ranging from 20° C. to 200° C. According to this embodiment, a double-sided self-adhesive article is obtained.

The coating step (b) may be performed by means of known coating devices, for instance a lip nozzle or a nozzle of curtain type, or else with a roller. It uses a weight per unit area of adhesive composition ranging from 10 $g/m^2$ to 5000 $g/m^2$.

The weight per unit area of adhesive composition necessary for the manufacture of self-adhesive labels can range from 10 to 100 $g/m^2$, preferably from 20 to 50 $g/m^2$. The weight per unit area required for the manufacture of self-adhesive tapes may vary within a much wider range extending from 3 to 5000 $g/m^2$, preferably from 15 to 250 $g/m^2$ per face.

According to one embodiment, the coated adhesive composition is also subjected, during step (c), to a treatment under a humid atmosphere characterized by its moisture level and, in particular, in a gaseous environment in which water molecules are present at between 10 and 200 g per $m^3$ of gas.

Preferably, the humid atmosphere is an atmosphere in which from 2% to 100% of the molecules are water molecules, preferably from 3% to 50%, more preferably from 3% to 10%, of the molecules are water molecules.

The moisture content is expressed as the percentage of water per unit volume, which corresponds to the number of water molecules divided by the total number of molecules in a unit of volume. By virtue of the linear nature of this scale, the moisture content is readily measured and monitored by using, for example, monitors of P.I.D (Proportional-Integral-Derivative) type. The weight percentage may be calculated by multiplying the percentage of the number of water molecules relative to the total number of molecules by a factor of 0.622. General information regarding the moisture content in various environments is described by W. Wagner et al. in *International Steam Tables—Properties of Water and Steam based on the Industrial Formulation IAPWS-IF*97.

The thermal crosslinking step has the effect notably of creating—between the polymer chains bearing hydrolysable alkoxysilane end groups of the adhesive composition and under the action of atmospheric moisture—bonds of siloxane type which lead to the formation of a three-dimensional polymer network. The adhesive composition thus crosslinked is in particular a pressure-sensitive adhesive which gives the support layer which is coated therewith the desirable adhesive power and tack.

Preferably, the coating is performed uniformly over the support layer or over the non-stick protective layer, but the coating may also be adapted to the desired shape of the final self-adhesive article.

According to one embodiment, coating with the adhesive composition is performed over at least a portion of the two faces of the support layer. If the two faces of the support layer are coated, the adhesive composition may be identical or different on the two faces and the weight per unit area may be identical or different on the two faces.

According to one embodiment of the invention, the self-adhesive article comprises an adhesive layer on at least a portion of one face or on at least a portion of the two faces of the support layer, said adhesive layer(s) being optionally coated with a non-stick protective layer. According to one embodiment, the self-adhesive article comprises two non-stick protective layers on each of the two adhesive layers. In this case, the two protective layers can be made of identical or different materials and/or they may have an identical or different thickness.

According to a preferred variant of the process for manufacturing the self-adhesive article according to the invention, using the multicomponent adhesive composition as defined previously, step (b) of application by coating onto the bearing surface, for example onto the support layer (96), is performed by means of a facility for hot application (20) of said adhesive composition, the facility comprising:

- a nozzle (50) for applying the multicomponent adhesive composition;
- a line (88*a*) for feeding the composition U included in the multicomponent adhesive composition to be applied in fluid form;
- a line (66*a*) for feeding the composition V included in the multicomponent adhesive composition to be applied in fluid form;
- a line (88) for feeding the nozzle (50) with the multicomponent adhesive composition to be applied in fluid form; and
- a mixer (30) for mixing at least the compositions U and V of the multicomponent adhesive composition;

said step (b) comprising:

- supplying the feed line (88*a*) with at least the composition U;
- supplying the feed line (66*a*) with at least the composition V;
- mixing at least the composition U and the composition V of the multicomponent composition using a mixer (30); and
- hot application of the mixed multicomponent adhesive composition (80) onto a support layer or a bearing surface with the aid of the application nozzle (50).

The mixer may be a static mixer or a dynamic mixer.

Preferably, the static or dynamic mixer must be able to be temperature-regulated. Preferably, the mixer (30) is a dynamic mixer, advantageously allowing mixing at high shear, and the obtention of better homogeneity of the adhesive composition resulting from the mixing of at least compositions U and V of the multicomponent composition.

The mixer (30) may be arranged between the lines for feeding at least composition U (88*a*) and composition V (66*a*), and the feed line (88), and may allow homogeneous mixing of the compositions constituting the multicomponent, notably two-component, adhesive composition.

The process according to the invention comprises the mixing of at least composition U and composition V of the multicomponent composition using a mixer (30). The mixing step may be a mixing of composition U with composition V, and optionally with one or more additional compositions of the multicomponent composition.

The facility may comprise heating means (44) suitable for being placed in a storage reservoir (82) comprising composition U or composition V or another additional composition of the multicomponent composition, to raise said composition to a pumping temperature; preferably, at least composition U is raised to a pumping temperature of between 50° C. and 140° C., preferably between 80° C. and 120° C., more preferentially between 90° C. and 110° C.

Preferably, the multicomponent adhesive composition is applied (after mixing at least compositions U and V) at a temperature of between 50° C. and 140° C., preferably between 50° C. and 120° C., more preferentially between 60° C. and 90° C.

FIG. 1 shows a schematic representation of one embodiment of a facility 20 suitable for performing the process for manufacturing the self-adhesive article according to the invention.

According to one embodiment, as a result of the at least double supply, composition V (66) is separated from composition U (68) up to the mixer (30) placed between the lines for feeding at least compositions U (88*a*) and V (66*a*), on the one hand, and the line (88) for feeding the multicomponent adhesive composition to be applied, on the other hand. In other words, the mixer (30) is in-line and allows a step of homogeneous mixing of compositions (66) and (68) supplied separately to be performed. The injection of composition V (66) into composition U (68) is performed in the mixer (30), as illustrated, for example, in FIG. 1, to allow immediate mixing of these compositions.

The various compositions constituting the multicomponent adhesive composition according to the invention may be totally separated, i.e. each composition is supplied separately to the hot application facility (20). In particular, the injection of composition U (68), of composition V (66) and of optional additional composition(s) of the multicomponent adhesive composition is performed in the mixer (30).

In the facility according to the invention, composition U (68) may be heated in the storage reservoir (82) by means of a heating means (44), without bringing about crosslinking of composition U (68) due to the separation from composition V (66), comprising at least the crosslinking catalyst. Heating in the storage reservoir (82), represented in the form of a drum, in particular makes it possible to reduce the viscosity of composition U (68), to facilitate the pumping in the facility (20), such as with the aid of a pump (46), before any contact with the separate composition V (66).

This heating means (44) (preferably being a hotplate) notably contributes toward bringing composition U (68) to the application temperature. The application temperature notably corresponds to a temperature at which the adhesive composition to be applied has a viscosity that is low enough to allow the application, in other words the coating, of the mixed multicomponent adhesive composition (80) onto the surface (96).

Specifically, after mixing compositions V (66) and U (68), the multicomponent adhesive composition (80) is constituted and can be applied hot to the support (96) with the aid of an application nozzle (50). A temperature for applying the multicomponent adhesive composition (80) may thus correspond to a temperature at which the viscosity of the multicomponent adhesive composition is less than or equal to 50 Pa·s, preferably less than or equal to 10 Pa·s. By way of example, the multicomponent adhesive composition (80) may have a viscosity of 5±1 Pa·s at an application temperature ranging from 60° C. to 120° C. Following the application of the multicomponent adhesive composition (80) to the surface (96), the coated support (98) is subjected to a controlled temperature, and optionally to a controlled moisture level, to allow the crosslinking of the multicomponent adhesive composition.

The controlled temperature may be obtained with the aid of an oven or a chamber. The controlled temperature corresponds to a temperature of crosslinking of the multicomponent adhesive composition (80) and is, for example, between 50° C. and 200° C., preferably between 80° C. and 160° C., in particular between 100° C. and 150° C.

Similarly, composition V (66) may itself also be heated before it is mixed with composition U (68) without any risk of crosslinking before they are mixed. This is likewise the case for any composition of the multicomponent composition according to the invention.

The heating of all of the separate compositions V (66) and U (68) before mixing them notably makes it possible to bring these components to the application temperature without any risk of crosslinking before they are mixed in the mixer (30).

The self-adhesive article according to the invention may finally be used in a bonding method which is also the subject of the invention, characterized in that it comprises the following steps:

a) removing the non-stick protective layer, when such a layer is present;
b) applying the self-adhesive article to one surface of a product; and
c) applying a pressure to said article.

In step b), the self-adhesive article is applied so that the self-adhesive part of the article (formed by the self-adhesive layer) is facing the surface of the product.

According to an embodiment in which the self-adhesive article is a double-sided article, the bonding method also comprises a step in which either a second surface of a product is applied to the article bonded to the first surface of a product, or the article bonded to the first surface of a product is applied to a second surface of a product.

The examples that follow are given purely by way of illustration of the invention and should not be interpreted to limit the scope thereof.

EXAMPLES

The examples that follow are given purely by way of illustration of the invention and should not be interpreted to limit the scope thereof.

Example A (Reference): Heat-Crosslinkable Adhesive Composition Based on Geniosil® STP-E30 without Silylated Tackifying Resin A1. Preparation of the Composition:

The composition given in Table 1 is prepared by first of all introducing the non-silylated tackifying resin Dertophene® T105 into a glass reactor under vacuum and heated to approximately 160° C. Then, once the resin has fully melted, the Geniosil® STP-E30 is added.

The mixture is stirred under vacuum for 15 minutes and then cooled to 90° C. The catalyst (K-KAT® 5218) is then introduced with rapid stirring. The mixture is kept under vacuum and with stirring for a further 10 minutes.

A2. Preparation of a PET Support Layer Coated with the Crosslinked Composition, at a Weight Per Unit Area Equal to 60 g/m$^2$:

A rectangular sheet of polyethylene terephthalate (PET) with a thickness of 50 μm and dimensions of 20 cm by 40 cm is used as support layer.

The composition obtained in point A1 is preheated to a temperature close to 100° C. and is introduced into a cartridge, from where a bead is extruded which is deposited close to the edge of the sheet parallel to its width.

The composition included in this bead is then spread over the whole surface of the sheet, so as to obtain a uniform layer of substantially constant thickness. A film spreader (also known as a film applicator) is used to do this, and is moved from the edge of the sheet to the opposite edge. A layer of composition corresponding to a weight per unit area of 60 g/m$^2$ is thus deposited, which represents an approximate thickness of the order of 60 μm.

The PET sheet thus coated is then placed in an oven at 140° C. and under a humid atmosphere (2.4% relative humidity) for 5 minutes for crosslinking of the composition, and is then laminated onto a protective non-stick layer consisting of a rectangular silicone-treated film sheet of the same dimensions.

The triple layer obtained is subjected to the tests described below.

A3. 180° Peel Test on a Stainless-Steel Plate:

The adhesive power is evaluated by the 180° peel test on a stainless-steel plate, as described in the FINAT method No. 1, published in the FINAT Technical Handbook, 6$^{th}$ edition, 2001. FINAT is the International Federation of Self-Adhesive Label Manufacturers and Converters. The principle of this test is as follows:

A test specimen in the form of a rectangular strip (25 mm×150 mm) is cut out from the triple layer obtained previously.

This test specimen, after it has been prepared, is stored for 7 days at a temperature of 23° C. and under an atmosphere with a relative humidity of 50%. It is then attached over two-thirds of its length (after removal of the corresponding portion of protective non-stick layer) to a substrate consisting of a stainless-steel plate. The assembly obtained is left at ambient temperature for 20 minutes. It is then placed in a tensile testing device capable, starting from the end of the rectangular strip which has remained free, of performing the peeling or detachment of the strip at an angle of 180° and with a separation speed of 300 mm per minute. The instrument measures the force required to detach the strip under these conditions.

The corresponding result is expressed in N/25 mm and indicated in Table 1.

A4. 180° Peel Test on an ABS (Acrylonitrile Butadiene Styrene Polymer) Plate:

The evaluation of the adhesive power by the test mentioned previously is repeated, replacing the stainless-steel plate with an ABS plate.

The corresponding result is also expressed in N/25 mm and indicated in Table 1.

A5. Shear Strength Time at 125° C.:

This test is directed towards evaluating the maintenance of the cohesion of the adhesive seal formed by the self-adhesive PET support layer obtained in A2 at high temperature, when the latter is attached to a substrate.

The test determines the static shear strength time of said adhesive seal at 125° C. in accordance with FINAT method No. 8. The principle is as follows:

A test specimen in the form of a rectangular strip (25 mm×75 mm) is cut out from the triple layer obtained in A2 and stored at room temperature (23° C., 50% humidity) for 7 days.

After removal of all of the protective non-stick layer, a square portion with a side length of 25 mm located at the end of the adhesive strip is attached to a sanded stainless-steel plate.

The test plate thus obtained is placed, by means of an appropriate support, in a substantially vertical position in an oven at 125° C., the non-adhesively bonded part of the strip with a length of 50 mm being located below the plate. After thermal equilibration, the portion of the strip which has remained free is connected to a 1 kg weight, the whole of the device remaining in said oven at 125° C. throughout the duration of the test.

Under the effect of this weight, the adhesive seal attaching the strip to the plate is subjected to a shearing stress. For more effective control of this stress, the test plate is in fact placed so as to form an angle of 2° relative to the vertical.

The time at which the strip detaches from the sheet following the failure of the adhesive seal under the effect of this stress is recorded.

The result, expressed in hours, is indicated in Table 1.

A6. Temperature Causing Static Shear Failure of the Adhesive Seal (SAFT):

This test is directed towards evaluating, additionally, the maintenance of the cohesion of the adhesive seal formed by the self-adhesive PET support layer obtained in A2 at high temperature, when the latter is attached to a substrate.

The test determines the temperature at which the adhesive seal fails under static shear. This test is also known as the Shear Adhesion Failure Temperature (SAFT) test.

The operations described in the previous test A5 are repeated, except that an oven with an initial temperature of 30° C. is used both for the initial thermal equilibration of the test plate, and also for placing the whole device with the 1 kg mass therein. This oven is subjected to a programmed temperature rise of 0.5° C. per minute (Finat 8 standard).

The temperature at which the strip detaches from the plate as a result of failure of the adhesive seal is noted.

This temperature, expressed in ° C., is indicated in Table 1.

Examples 1 and 2 (According to the Invention): Heat-Crosslinkable Adhesive Compositions Based on Geniosil® STP-E30 with Silylated Tackifying Resin Example A is repeated with the compositions given in Table 1.

These compositions are prepared in accordance with protocol A1, except that the silylated tackifying resin Mkorez® HRR-100 is introduced at the same time as the non-silylated tackifying resin.

The results of the peel, 125° C. shear strength and SAFT tests are also indicated in Table 1.

TABLE 1

| | | Amount in weight/weight % | | |
|---|---|---|---|---|
| | Ingredient | Example A | Example 1 | Example 2 |
| (A) | Geniosil ® STP-E30 | 44.38 | 44.38 | 44.15 |
| (B) | Mkorez ® HRR-100 | — | 9.74 | 16.19 |
| (C) | Dertophene ® T105 | 54.34 | 44.60 | 37.77 |
| | Irganox ® 1010 | 0.45 | 0.45 | 0.445 |
| | Irganox ® 245 | 0.45 | 0.45 | 0.445 |
| (D) | K-KAT ® 5218 | 0.38 | 0.38 | 1 |
| | 180° peel on a stainless-steel plate (N/25 mm) | 24.6 | 22.7 | 23.3 |
| | 180° peel on an ABS plate (N/25 mm) | 20.4 | 19.6 | 19.4 |
| | Shear strength time at 125° C. (hours) | 21.2 | 87.1 | >96 |
| | SAFT (° C.) | 170 | 195 | 198 |

For a very similar 180° peel result relative to the one in Example A (both on steel and on ABS), the self-adhesive PET support layer prepared with the compositions of Examples 1 and 2 shows a significant increase in SAFT temperature (by at least 25° C.) and a more than fourfold increase in shear strength time at 125° C.

These results consequently show that the composition of Examples 1 and 2 advantageously allows the formation of an adhesive seal which, while retaining its adhesive power, shows greatly improved cohesion at elevated temperature.

The invention claimed is:

1. Heat-crosslinkable adhesive composition comprising:

a polymer (A) comprising at least one hydrolysable alkoxysilane group;

a silylated tackifying resin (B) chosen from a silylated copolymer resin (B') and a silylated copolymer resin (B"):

said resin (B') comprising:

a repeating unit (B'1) derived from a silylated olefin monomer; and one or more repeating units (B'2) derived from olefin or diolefin monomers included in a petroleum fraction obtained by cracking naphtha and chosen from a C5 fraction, a C9 fraction, dicyclopentadiene and mixtures thereof; and said resin (B") being obtained by hydrogenation of the resin (B');

a non-silylated tackifying resin (C) that is compatible with the polymer (A); and a crosslinking catalyst (D), said adhesive composition cross-linking upon heating to a temperature ranging from 50° C. to 200° C.

2. Adhesive composition according to claim 1, characterized in that the polymer (A) comprises at least one hydrolysable group of formula (I):

$$Si(R^4)_p(OR^5)_{3-p} \quad (I)$$

in which:

$R^4$ represents a linear or branched alkyl radical comprising from 1 to 4 carbon atoms, with the possibility that when there are several radicals $R^4$, these radicals are identical or different;

$R^5$ represents a linear or branched alkyl radical comprising from 1 to 4 carbon atoms, with the possibility that when there are several radicals $R^5$, these radicals are identical or different, with the possibility that two groups $OR^5$ may be engaged in the same ring; and p is an integer equal to 0, 1 or 2.

3. Adhesive composition according to claim 2, characterized in that the hydrolysable alkoxysilane group of formula (I) is such that p is equal to 1 or 2.

4. Adhesive composition according to claim 2, characterized in that the polymer (A) corresponds to one of the formulae (II), (III) or (IV):

(II)

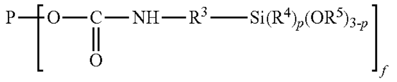

(III)

$$P-[O-R^3-Si(R^4)_p(OR^5)_{3-p}]_f$$

(IV)

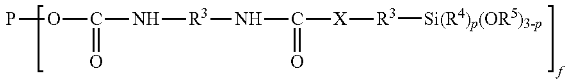

in which:

P represents a saturated or unsaturated, linear or branched polymeric radical optionally comprising one or more heteroatoms, such as oxygen, nitrogen, sulfur or silicon, and having a number-average molar mass ranging from 500 g/mol to 60000 g/mol, the number-average molar mass being measured by size exclusion chromatography using a polystyrene standard, $R^1$ represents a divalent hydrocarbon-based radical comprising from 5 to 15 carbon atoms, which may be aromatic or aliphatic, linear, branched or cyclic, $R^3$ represents a linear or branched divalent alkylene radical comprising from 1 to 6 carbon atoms, X represents a divalent radical chosen from —NH—, —$NR^7$— or —S—, $R^7$ represents a linear or branched alkyl radical comprising from 1 to 20 carbon atoms, and which optionally also comprises one or more heteroatoms, and f is an integer ranging from 1 to 6.

5. Adhesive composition according to claim 4, characterized in that the polymer (A) corresponds to one of the formulae (II'), (III') or (IV'):

(II')

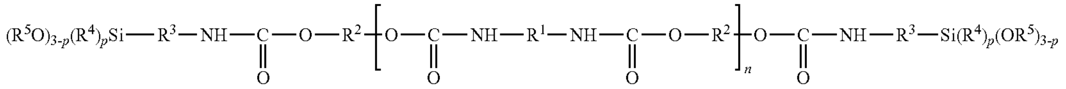

(III')

$$(R^5O)_{3-p}(R^4)_pSi-R^3-O-R^2-O-R^3-Si(R^4)_p(OR^5)_{3-p}$$

-continued (IV')

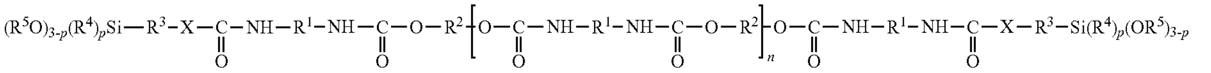

in which:

$R^2$ represents a saturated or unsaturated, linear or branched divalent hydrocarbon-based radical optionally comprising one or more heteroatoms, and having a number-average molar mass ranging from 500 g/mol to 60000 g/mol, the number-average molar mass being measured by size exclusion chromatography using a polystyrene standard, and n is an integer greater than or equal to 0.

6. Adhesive composition according to claim 5, characterized in that the polymer (A) is a silylated polymer of formula (II') in which n is equal to 0 and $R^2$ is a divalent radical derived from a polyether.

7. Adhesive composition according to claim 1, characterized in that the silylated tackifying resin (B) is a silylated copolymer resin (B').

8. Adhesive composition according to claim 1, characterized in that the silylated olefin from which the repeating unit (B'1) is derived comprises at least one alkoxysilyl group.

9. Adhesive composition according to claim 1, characterized in that the silylated copolymer resin (B') comprises, in addition to the repeating units (B'1) and (B'2), a repeating unit derived from a monomer chosen from a cyclic anhydride, a C3-C20 α-olefin, or a styrene derivative.

10. Adhesive composition according to claim 1, characterized in that the silylated copolymer resin (B) has a number-average molecular mass (Mn) of between 100 and 5000 g/mol, the number-average molecular mass being measured by size exclusion chromatography using a polystyrene standard.

11. Adhesive composition according to claim 1, characterized in that the non-silylated tackifying resin (C) is chosen from:

(i) resins obtained by polymerization of terpene hydrocarbons and of phenols, in the presence of Friedel-Crafts catalysts;

(ii) resins obtained by a process comprising the polymerization of a-methylstyrene, it also being possible for said process to comprise a reaction with phenols;

(iii) rosins of natural origin and derivatives thereof which are hydrogenated, dimerized, polymerized or esterified with monoalcohols or polyols;

(iv) resins obtained by hydrogenation, polymerization or copolymerization (with an aromatic hydrocarbon) of mixtures of unsaturated aliphatic hydrocarbons containing 5, 9 or 10 carbon atoms obtained from petroleum fractions;

(v) terpene resins;

(vi) copolymers based on natural terpenes; or (vii) acrylic resins having a viscosity at 100° C. of less than 100 Pa·s, the viscosity being measured by a Brookfield-type method.

12. Adhesive composition according to claim 1, characterized in that it is in the form of a one-component composition comprising:

from 10% to 90% by weight of the polymer(s) (A) comprising at least one hydrolysable alkoxysilane group;

from 3% to 50% by weight of the silylated tackifying resin(s) (B);

from 15% to 80% by weight of the non-silylated tackifying resin(s) (C); and from 0.01% to 10% by weight of the crosslinking catalyst (D);

these weight percentages being indicated on the basis of the total weight of one-component composition.

13. Adhesive composition according to claim 1, characterized in that it is in the form of a multicomponent composition comprising:

a composition U comprising:
 the polymer(s) (A); and
 the silylated tackifying resin(s) (B);
 the non-silylated tackifying resin(s) (C); and
a composition V comprising:
 the crosslinking catalyst(s) (D); and optionally
 at least one compound (E) chosen from:
  a compound (E1) having a number-average molecular mass ranging from 300 g/mol to 100000 g/mol, the number-average molecular mass being measured by size exclusion chromatography using a polystyrene standard; and
  a compound (E2) with a vapour pressure at 20° C. of greater than or equal to 0.08 kPa.

14. Self-adhesive article comprising a support layer coated with a self-adhesive layer, characterized in that said self-adhesive layer consists of the adhesive composition as defined in claim 1, in the crosslinked state.

15. Process for manufacturing the self-adhesive article as defined in claim 14, said process being characterized in that it comprises:

(a) preheating to a temperature of between 40° C. and 130° C. the heat-crosslinkable adhesive composition recited in claim 14;

(b) applying said composition by coating onto a bearing surface;

(c) crosslinking said composition, by heating to a temperature ranging from 50° C. to 200° C.; and then (d) laminating or transferring the layer of crosslinked adhesive composition onto a support layer or onto a non-stick protective film.

16. Process according to claim 15, characterized in that the adhesive composition is in the form of a multicomponent composition comprising:

a composition U comprising:
 the polymer(s) (A); and
 the silylated tackifying resin(s) (B);
 the non-silylated tackifying resin(s) (C); and
a composition V comprising:
 the crosslinking catalyst(s) (D); and optionally
 at least one compound (E) chosen from:
  a compound (E1) having a number-average molecular mass ranging from 300 g/mol to 100000 g/mol, the number-average molecular mass being measured by size exclusion chromatography using a polystyrene standard; and
  a compound (E2) with a vapour pressure at 20° C. of greater than or equal to 0.08 kPa, and characterized in that process step (b) of applying the adhesive composition by coating it onto a bearing surface is performed using a facility for the hot application of said adhesive composition, the facility comprising:
- a nozzle for applying the multicomponent adhesive composition;
- a line for feeding the composition U included in the multicomponent adhesive composition to be applied in fluid form;
- a line for feeding the composition V included in the multicomponent adhesive composition to be applied in fluid form;
- a line for feeding the nozzle with the multicomponent adhesive composition to be applied in fluid form; and
- a mixer for mixing at least the compositions U and V of the multicomponent adhesive composition;

said step (b) comprising:
- supplying the feed line with at least the composition U;
- supplying the feed line with at least the composition V;
- mixing at least the composition U and the composition V of the multicomponent composition using a mixer; and
- hot application of the mixed multicomponent adhesive composition onto a support layer or a bearing surface with the aid of the application nozzle.

17. Bonding method using the self-adhesive article as defined in claim 14, characterized in that it comprises the following steps:
- a) removing the non-stick protective layer, when such a layer is present;
- b) applying the self-adhesive article to one surface of a product; and
- c) applying a pressure to said article.

* * * * *